United States Patent
Strobel

(10) Patent No.: US 12,013,696 B2
(45) Date of Patent: Jun. 18, 2024

(54) REACTIVE SUSPENSION AND EMERGENCY SIGNALING IN AUTONOMOUS TRUCKING SYSTEMS

(71) Applicant: Waymo LLC, Mountain View, CA (US)

(72) Inventor: Andre Strobel, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 59 days.

(21) Appl. No.: 17/537,304

(22) Filed: Nov. 29, 2021

(65) Prior Publication Data

US 2022/0169260 A1    Jun. 2, 2022

Related U.S. Application Data

(60) Provisional application No. 63/199,005, filed on Dec. 1, 2020.

(51) Int. Cl.
| | |
|---|---|
| *G05D 1/00* | (2006.01) |
| *B60G 17/016* | (2006.01) |
| *B60Q 1/04* | (2006.01) |
| *B60Q 1/30* | (2006.01) |
| *B60Q 1/34* | (2006.01) |
| *B60W 10/20* | (2006.01) |
| *B60W 30/14* | (2006.01) |
| *B60W 30/18* | (2012.01) |
| *B60W 40/06* | (2012.01) |

(Continued)

(52) U.S. Cl.
CPC ........ *G05D 1/0088* (2013.01); *B60G 17/016* (2013.01); *B60Q 1/04* (2013.01); *B60Q 1/30* (2013.01); *B60Q 1/34* (2013.01); *B60W 10/20* (2013.01); *B60W 30/143* (2013.01); *B60W 30/18163* (2013.01); *B60W 40/06* (2013.01); *B60W 40/072* (2013.01); *B60W 40/12* (2013.01); *B60W 60/001* (2020.02); *B60W 60/00182* (2020.02); *B62D 35/00* (2013.01); *G01S 13/931* (2013.01); *G01S 15/931* (2013.01); *G01S 17/931* (2020.01); *G09F 7/00* (2013.01); *B60W 2300/12* (2013.01); *B60W 2420/403* (2013.01); *B60W 2420/408* (2024.01); *B60W 2420/54* (2013.01); *B60W 2510/222* (2013.01); *B60W 2555/20* (2020.02); *G01S 2013/9315* (2020.01)

(58) Field of Classification Search
CPC .............. G05D 1/0088; G01S 17/931; B60W 60/00182; B60W 60/001; B60G 17/016
See application file for complete search history.

(56) References Cited

U.S. PATENT DOCUMENTS

| | | | |
|---|---|---|---|
| 10,486,485 B1 * | 11/2019 | Levinson | ........... B60G 17/0162 |
| 2018/0015801 A1 * | 1/2018 | Mohamed | ............... H04L 67/12 |

(Continued)

*Primary Examiner* — Peter D Nolan
*Assistant Examiner* — Mikko Okechukwu Obioha
(74) *Attorney, Agent, or Firm* — Lowenstein Sandler LLP

(57) ABSTRACT

Aspects and implementations of the present disclosure relate to performance and safety improvements for autonomous trucking systems, such as reactive suspensions for maximizing aerodynamic performance and minimizing mechanical impact from road imperfections, automated placement of emergency signaling devices, and techniques of enhanced illumination of stopped and stranded vehicles.

20 Claims, 12 Drawing Sheets

(51) Int. Cl.
*B60W 40/072* (2012.01)
*B60W 40/12* (2012.01)
*B60W 60/00* (2020.01)
*B62D 35/00* (2006.01)
*G01S 13/931* (2020.01)
*G01S 15/931* (2020.01)
*G01S 17/931* (2020.01)
*G09F 7/00* (2006.01)

(56) References Cited

U.S. PATENT DOCUMENTS

| | | | | |
|---|---|---|---|---|
| 2019/0079539 | A1* | 3/2019 | Sridhar | G05D 1/0231 |
| 2020/0384980 | A1* | 12/2020 | Yu | G05D 1/0223 |
| 2022/0105772 | A1* | 4/2022 | Kim | B60G 17/0165 |
| 2022/0355819 | A1* | 11/2022 | Yu | B60W 50/00 |
| 2022/0363102 | A1* | 11/2022 | Min | B60G 17/06 |
| 2022/0363289 | A1* | 11/2022 | Nehmadi | B60W 40/06 |
| 2022/0388363 | A1* | 12/2022 | Zhang | B60G 17/0525 |
| 2023/0184563 | A1* | 6/2023 | Arreaza | G01M 3/3272 |
| | | | | 701/450 |

* cited by examiner

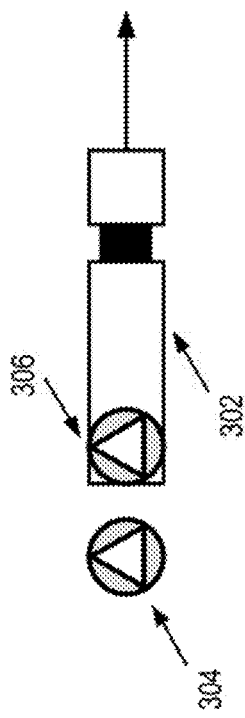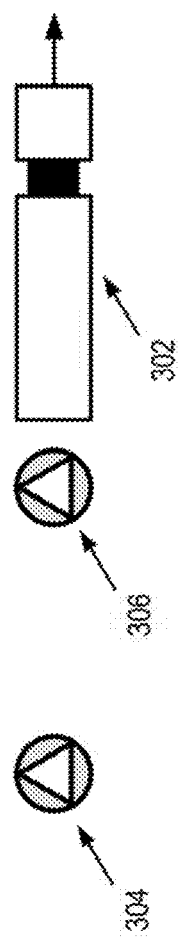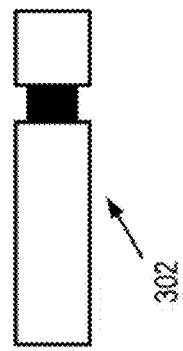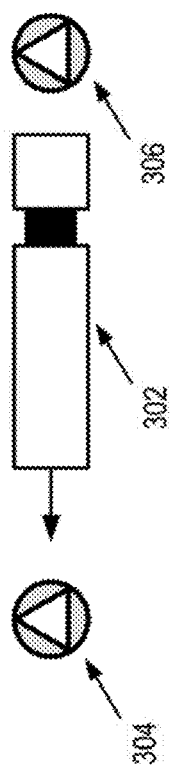

REACTIVE SUSPENSION AND EMERGENCY SIGNALING IN AUTONOMOUS TRUCKING SYSTEMS

RELATED APPLICATIONS

This application claims the benefit of U.S. Provisional Application No. 63/199,005, filed Dec. 1, 2021, the entire contents of which is being incorporated herein by reference.

TECHNICAL FIELD

The instant specification generally relates to autonomous vehicles. More specifically, the instant specification relates to performance and safety improvements for autonomous trucking systems, such as reactive suspensions for maximizing aerodynamic performance and minimizing mechanical impact from road defects, automated placement of emergency signaling devices, and methods of enhanced illumination of stopped and stranded vehicles.

BACKGROUND

An autonomous vehicle operates by sensing an outside environment with various sensors and charting a driving path through the environment based on the sensed data, Global Positioning System (GPS) data, and road map data. Among the autonomous vehicles are trucks used for long-distance load deliveries. Trucking industry is sensitive to various operational costs and fuel costs, in particular. Autonomous trucks have to meet high standards of safety, which can include both the standards common for all vehicles (driver-operated and autonomously driven alike) as well as additional standards specific for autonomous trucks. Various solutions that improve fuel efficiency, performance, and safety have to be designed without reliance on visual perception, driving experience, and decision-making abilities of a human operator.

BRIEF DESCRIPTION OF THE DRAWINGS

The present disclosure is illustrated by way of examples, and not by way of limitation, and can be more fully understood with references to the following detailed description when considered in connection with the figures, in which:

FIG. 3B illustrates a deployment of a first warning device by the autonomously driven truck at a first time. FIG. 3C illustrates a deployment of a second warning device by the autonomously driven truck at a second time. FIG. 3D illustrates positioning of the first warning device, the second warning device, and the autonomously driven truck by the time all three objects have stopped. FIG. 3E illustrates a final positioning of the autonomously driven truck relative to the first warning device and the second warning device.

SUMMARY

Figure 1A:
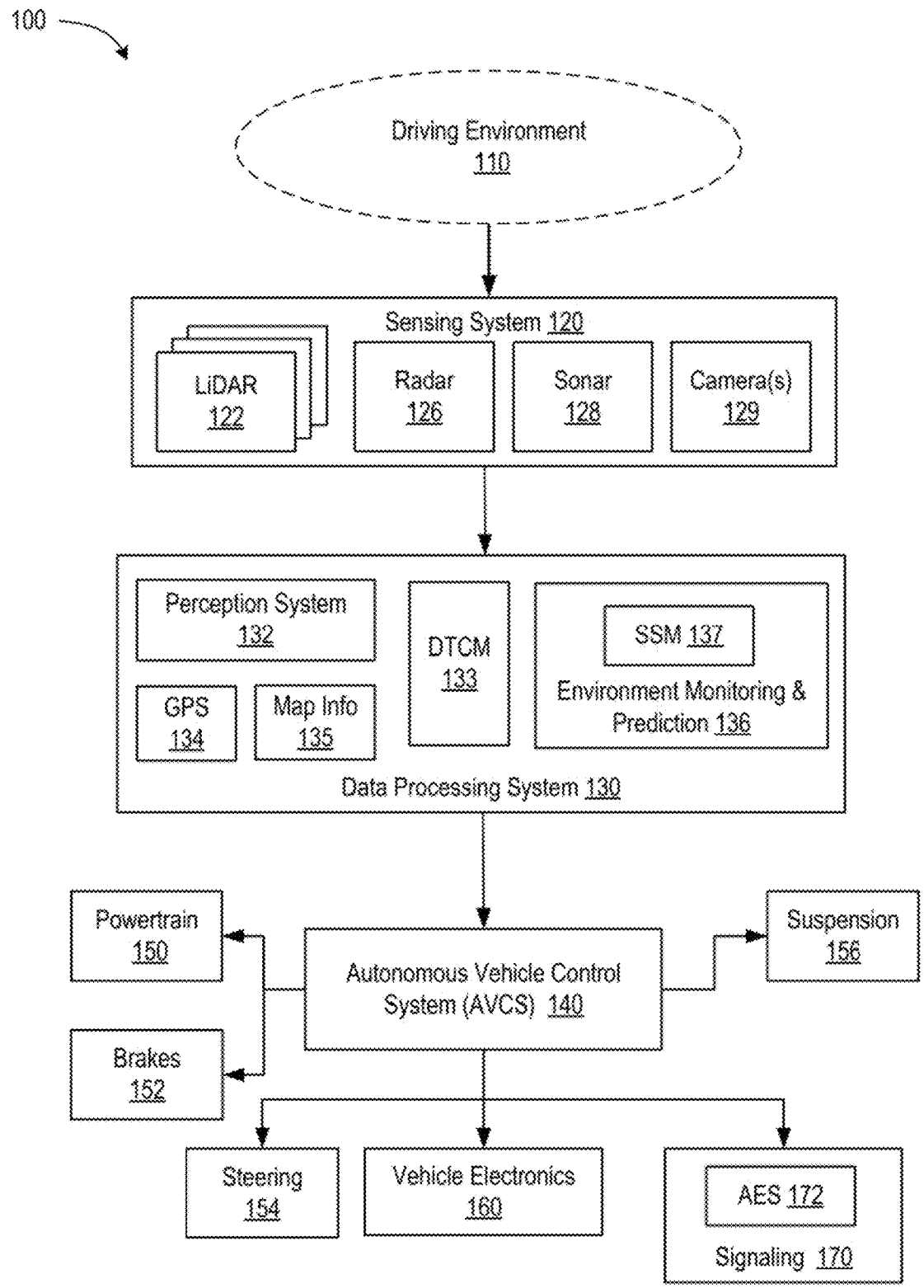
FIG. 1A is a diagram illustrating components of an example autonomous vehicle, such as an autonomously driven truck, that uses sensing and perception technology to support autonomous driving operations, in accordance with some implementations of the present disclosure.

In one implementation, disclosed is a method to operate an autonomously driven truck (ADT), the method including: obtaining a first set of road data characterizing a quality of a first portion of a road traveled by the ADT; identifying, using a data processing system of the ADT and based on the first set of road data, one or more road imperfections; determining one or more first parameters characterizing the one or more road imperfections; and determining, by the data processing system of the ADT and using the one or more first parameters, first settings of a suspension of the ADT, wherein the first settings comprise: a first height of the suspension of the ADT, and a first stiffness of the suspension of the ADT; and causing an autonomous control system of the ADT to configure the suspension of the ADT based on the first settings.

In another implementation, disclosed is a method to deploy a warning device from an autonomously driven truck (ADT), the method including: causing, using an ADT control system, the ADT to begin a deceleration; causing the warning device to be released from the ADT and make contact with a roadway; and controlling the deceleration of the ADT to bring the ADT to a stop at a distance from the warning device that is within a range of target distances.

In another implementation, disclosed is a method to operate a system of lighting devices (SLD) of an autonomously driven truck (ADT), the method including: causing the ADT to stop or slow down; and initiating flashing of a plurality of subsystems of the SLD, the plurality of subsystems of the SLD comprising at least two of: a headlight subsystem of the SLD, a turning light subsystem of the SLD, a taillight subsystem of the SLD, or a marker light subsystem of the SLD.

DETAILED DESCRIPTION

Autonomously driven trucks (ADTs) are large vehicles capable of delivering one or more cargo trailers to various destinations reachable by highways, city streets, rural roads, and the like. Computer vision of ADTs is facilitated by a sensing system that can include light detection and ranging devices (lidars), radar detection and ranging devices (radars), cameras, various positioning systems, sonars, and so on. The sensing system detects (at run time) other vehicles, pedestrians, obstacles, road signs, changing weather conditions, construction zones, and so on. Dynamic data obtained by the sensing system complements more static mapping data that maps roadways and surrounding objects along a path of an ADT. Mapping data can be very detailed and comprehensive and can inform a data processing system of the ADT about a number of lanes at various sections of the road, width of the lanes, grade (angle of incline of the road surface), type and quality of the road surface, positions of road signs, parameters of road intersections, and so on. Detailed mapping data can occupy a large memory volume and can be loaded into memory ADT for a carefully pre-planned trucking mission, being tailored to a specific route to be taken by the ADT.

ADTs, similarly to driver-operated trucks, benefit from reducing aerodynamic drag forces that act on the vehicles. Setting a suspension system to a lower position that decreases the amount of airflow under the vehicle can reduce the aerodynamic drag forces and therefore save fuel. Road conditions, and quality of road surface in particular, can differ at different portions of a driving mission performed by an ADT. As a result, ADT operating with a suspension that is set too low, can incur body damage from road sections that have imperfections (pavement cracks, raised/lowered portions of the roadway, or any other surface defects). Setting a suspension to a higher position that anticipates occasional road imperfections, however, misses on the opportunity to reduce fuel consumption at other, often more numerous, sections of the road where road quality allows a much more aggressive approach to reducing the aerodynamic drag. Additionally, stopped ADTs typically have to be marked with one or more warning devices, such as emergency triangles or other types of markers, that forewarn other vehicles about the presence of the stopped vehicles. Such devices are easily placed by a truck driver, when necessary. ADTs, however, are not tended to by a human operator at most times when stopping may have to occur (e.g., due to a blown tire or a mechanical problem).

Aspects and implementations of the present disclosure address these and other shortcomings of the existing technologies by enabling techniques of identifying road imperfections, e.g., using a sensing system of an ADT, in real time and changing suspension settings (e.g., height and stiffness) in response to an impending contact of the ADT with a section having a reduced quality road and change the suspension settings back to more fuel-efficient settings once the quality of the road surface improves. Additionally, when encountering a portion of the road having sparsely-spaced but substantial road defects, the ADT can evaluate the gains in reduction of energy consumption on high-quality portions of the road (with lowered suspension settings) against the energy costs from having to frequently change the suspension settings (e.g., raise and lower a body of the ADT), and determine whether such changes are efficient.

Aspects and implementations of the present disclosure further disclose methods of automated placement of warning devices from ADTs that are still moving, but about to stop, and monitoring the deceleration schedule of the ADT to ensure that the warning devices are located within a legally-prescribed distance from the stopped ADTs. Additionally, implementations disclosed describe methods and system of enhanced illumination of stopped ADTs (e.g., under low ambient light conditions), which include using multiple illumination subsystems (headlights, marker lights, turning lights, etc.), including specially designed and positioned high-luminance lights to illuminate the body of the ADT. Different illumination subsystems can additionally be made flashing, according to various patterns, for enhanced long-distance visibility and forewarning of other vehicles that travel on the same road.

FIG. 1A is a diagram illustrating components of an example autonomous vehicle, such as a autonomously driven truck 100, that uses sensing and perception technology to determine driving a driving trajectory, in accordance with some implementations of the present disclosure. Although subsequent references are made to autonomously driven trucks (ADT), aspects and implementations of the present disclosure should be understood to apply to other autonomous motorized vehicles, such as cars, buses, motorcycles, all-terrain vehicles, recreational vehicles, any specialized farming or construction vehicles, sidewalk delivery robotic vehicles, and the like, or any other vehicles capable of being operated in an autonomously driven mode (without a human input or with a reduced human input).

For brevity and conciseness, various systems and methods are described below in conjunction with autonomous vehicles, but similar techniques can be used in various driver assistance systems that do not rise to the level of fully autonomous driving systems. More specifically, disclosed techniques can be used in Society of Automotive Engineers (SAE) Level 2 driver assistance systems that implement steering, braking, acceleration, lane centering, adaptive cruise control, etc., as well as other driver support. The disclosed techniques can be used in SAE Level 3 driving assistance systems capable of autonomous driving under limited (e.g., highway) conditions. Likewise, the disclosed techniques can be used in vehicles that use SAE Level 4 self-driving systems that operate autonomously under most regular driving situations and require only occasional attention of the human operator. In all such systems, reactive suspensions, automated placement of emergency devices, and enhanced illumination of stopped trucks can be used automatically without a driver input or with a reduced driver control and result in improved overall safety and efficiency of autonomous, semi-autonomous, and driver assistance systems.

A driving environment 110 can include any objects (animated or non-animated) located outside the ADT, such as roadways, buildings, trees, bushes, sidewalks, bridges, mountains, other vehicles, pedestrians, and so on. The driving environment 110 can be urban, suburban, rural, highway and so on. In some implementations, the driving environment 110 can be an off-road environment (e.g. farming or agricultural land). In some implementations, the driving environment can be an indoor environment, e.g., the environment of an industrial plant, a shipping warehouse, a hazardous area of a building, and so on. In some implementations, the driving environment 110 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 110 can be located at any distance from the autonomous vehicle, from close distances of several feet (or less) to several miles (or more).

The example ADT 100 can include a sensing system 120. The sensing system 120 can include various electromagnetic (e.g., optical) and non-electromagnetic (e.g., acoustic) sensing subsystems and/or devices. The terms "optical" and "light," as referenced throughout this disclosure, are to be understood to encompass any electromagnetic radiation (waves) that can be used in object sensing to facilitate autonomous driving, e.g., distance sensing, velocity sensing, acceleration sensing, rotational motion sensing, and so on. For example, "optical" sensing can utilize a range of light visible to a human eye, the UV range, the infrared range, the radio frequency range, etc.

The sensing system 120 can include a radar unit 126, which can be any system that utilizes radio or microwave frequency signals to sense objects within driving environment 110 of ADT 100. The radar unit 126 can be configured to sense both the spatial locations of the objects (including their spatial dimensions) and their velocities (e.g., using the Doppler shift technology).

The sensing system 120 can include one or more lidar sensors 122 (e.g., lidar rangefinders), which can be a laser-based unit capable of determining distances to the objects in driving environment 110, e.g., using time-of-flight (ToF) technology. The lidar sensor(s) 122 can utilize wavelengths of electromagnetic waves that are shorter than the wavelengths of the radio waves and can, therefore, provide a higher spatial resolution and sensitivity compared with the radar unit 126. The lidar sensor(s) 122 can include a coherent lidar sensor, such as a frequency-modulated continuous-wave (FMCW) lidar sensor. The lidar sensor(s) 122 can use optical heterodyne detection for velocity determination. In some implementations, the functionality of a ToF and coherent lidar sensor(s) is combined into a single (e.g., hybrid) unit capable of determining both the distance to and the radial velocity of the reflecting object. Such a hybrid unit can be configured to operate in an incoherent sensing mode (ToF mode) and/or a coherent sensing mode (e.g., a mode that uses heterodyne detection) or both modes at the same time. In some implementations, multiple lidar sensor(s) 122 can be mounted on ADT, e.g., at different locations separated in space, to provide additional information about transverse components of the velocity of the reflecting object.

Lidar sensor(s) 122 can include one or more laser sources producing and emitting signals and one or more detectors of the signals reflected back from the objects. lidar sensor(s) 122 can include spectral filters to filter out spurious electromagnetic waves having wavelengths (frequencies) that are different from the wavelengths (frequencies) of the emitted signals. In some implementations, lidar sensor(s) 122 can include directional filters (e.g., apertures, diffraction gratings, and so on) to filter out electromagnetic waves that can arrive at the detectors along directions different from the directions of the emitted signals. lidar sensor(s) 122 can use various other optical components (lenses, mirrors, gratings, optical films, interferometers, spectrometers, local oscillators, and the like) to enhance sensing capabilities of the sensors.

In some implementations, lidar sensor(s) 122 can scan a full 360-degree view within a horizontal plane. In some implementations, lidar sensor 122 can be capable of spatial scanning along both the horizontal and vertical directions. In some implementations, the field of view can be up to 90 degrees in the vertical direction (e.g., with at least a part of the region above the horizon being scanned by the lidar signals). In some implementations, the field of view can be a full hemisphere. For brevity and conciseness, when a reference to "lidar technology," "lidar sensing," "lidar data," and "lidar," in general, is made in the present disclosure, such a reference shall be understood also to encompass other sensing technology that operate at generally in the near-infrared wavelength, but may include sensing technology that operate at other wavelengths.

The sensing system 120 can further include one or more cameras 129 to capture images of the driving environment 110. The images can be two-dimensional projections of the driving environment 110 (or parts of the driving environment 110) onto a projecting plane (flat or non-flat, e.g. fisheye) of the cameras. Some of the cameras 129 of the sensing system 120 can be video cameras configured to capture a continuous (or quasi-continuous) stream of images of the driving environment 110. The sensing system 120 can also include one or more sonars 128, which can be ultrasonic sonars, in some implementations.

The sensing data obtained by the sensing system 120 can be processed by a data processing system 130 of ADT 100. For example, the data processing system 130 can include a perception system 132. The perception system 132 can be configured to detect and track objects in the driving environment 110 and to recognize the detected objects. For example, the perception system 132 can analyze images captured by the cameras 129 and can be capable of detecting traffic light signals, road signs, roadway layouts (e.g., boundaries of traffic lanes, topologies of intersections, designations of parking places, and so on), presence of obstacles, and the like. The perception system 132 can further receive the lidar sensing data (coherent Doppler data and incoherent ToF data) to determine distances to various objects in the environment 110 and velocities (radial and, in some implementations, transverse) of such objects. In some implementations, the perception system 132 can use the lidar data in combination with the data captured by the camera(s) 129. In one example, the camera(s) 129 can detect an image of a rock partially obstructing a traffic lane. Using the data from the camera(s) 129, the perception system 132 can be capable of determining the angular size of the rock, but not the linear size of the rock. Using the lidar data, the perception system 132 can determine the distance from the rock to the ADT and, therefore, by combining the distance information with the angular size of the rock, the perception system 132 can determine the linear dimensions of the rock as well.

In another implementation, using the lidar data, the perception system 132 can determine how far a detected object is from the ADT and can further determine the component of the object's velocity along the direction of the ADT's motion. Furthermore, using a series of quick images obtained by the camera, the perception system 132 can also determine the lateral velocity of the detected object in a direction perpendicular to the direction of the ADT's motion. In some implementations, the lateral velocity can be determined from the lidar data alone, for example, by recognizing an edge of the object (using horizontal scanning) and further determining how quickly the edge of the object is moving in the lateral direction. Each of the sensor frames can include multiple points. Each point can correspond to a reflecting surface from which a signal emitted by the sensing system 120 (e.g., by lidar sensor(s) 122, etc.) is reflected. The type and/or nature of the reflecting surface can be unknown. Each point can be associated with various data, such as a timestamp of the frame, coordinates of the reflecting surface, radial velocity of the reflecting surface, intensity of the reflected signal, and so on. The coordinates can be spherical (or cylindrical) coordinates, in one implementation. For example, the coordinates can include the radial distance, the polar angle (the angle the direction to the respective reflecting surface makes with the vertical direction or a horizontal plane), and the azimuthal angle (the angle indicating the direction within the horizontal plane). The radial distance can be determined from the lidar data whereas the angles can be independently known from a synchronizer data, a clock data, e.g., based on the known scanning frequency within the horizontal plane.

The perception system 132 can further receive information from a GPS transceiver (not shown) configured to obtain information about the position of the ADT relative to Earth. The GPS data processing module 134 can use the GPS data in conjunction with the sensing data to help accurately determine location of the ADT with respect to fixed objects of the driving environment 110, such as roadways, lane boundaries, intersections, sidewalks, crosswalks, road signs, surrounding buildings, and so on, locations of which can be provided by map information 135. In some implementations, other (than GPS) measurement units (e.g., inertial measurement units, speedometers, accelerometers, etc.) can also be used (alone or in conjunction with GPS) for identification of locations of the ADT relative to Earth. Additional tools to enable identification of locations can include various mapping algorithms based on data obtained by the perception system 132, which can be used (together with or separately from) map info 135. In some implementations, the data processing system 130 can receive non-electromagnetic data, such as sonar data (e.g., ultrasonic sensor data), temperature sensor data, pressure sensor data, meteorological data (e.g., wind speed and direction, precipitation data), and the like.

The data processing system 130 can further include a driving trajectory control module (DTCM) 133 to implement deceleration of an ADT in the course of stopping and placing warning devices. The data processing system 130 can further include an environment monitoring and prediction component 136, which can monitor how the driving environment 110 evolves with time, e.g., by keeping track of the locations and velocities of the animated objects (relative to Earth). In some implementations, the environment monitoring and prediction component 136 can keep track of the changing appearance of the environment due to motion of the ADT relative to the environment. In some implementations, the environment monitoring and prediction component 136 can make predictions about how various animated objects of the driving environment 110 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the environment monitoring and prediction component 136 can conclude that object 1 is resuming its motion from a stop sign or a red traffic light signal. Accordingly, the environment monitoring and prediction component 136 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 136 can conclude that object 2 is stopping at a stop sign or at a red traffic light signal. Accordingly, the environment monitoring and prediction component 136 can predict where object 2 is likely to be within the next 1 or 3 seconds. The environment monitoring and prediction component 136 can perform periodic checks of the accuracy of its predictions and modify the predictions based on new data obtained from the sensing system 120. The environment monitoring and prediction component 136 can include a suspension setting module (SSM) 137 to determine height and stiffness of suspension of ADT in response to detected quality of the road surface, as described in more detail below.

The data generated by the perception system 132, the DTCM 133, the GPS data processing module 134, and the environment monitoring and prediction component 136 can be used by an autonomous driving system, such as autonomous vehicle control system (AVCS) 140. The AVCS 140 can include one or more algorithms that control how the ADT is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the ADT. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain 150, brakes 152, steering 154 vehicle electronics 160, suspension 156, signaling 170, and other systems and components not explicitly shown in FIG. 1A. The powertrain 150 can include an engine (internal combustion engine, electric engine, and so on), transmission, differentials, axles, and wheels. The vehicle electronics 160 can include an on-board computer, engine management, ignition, communication systems, carputers, telematics, in-car entertainment systems, and other systems and components. The signaling 170 can include high and low headlights, stopping lights, turning and backing lights, marker lights and other lights used to signal to other road users as well as horns and alarms, inside lighting system, dashboard notification system, passenger notification system, radio and wireless network transmission systems, and so on. In some implementations, signaling 170 can include automated emergency signaling (AES) 172 to implement enhanced illumination of stranded vehicles and deployment of warning devices, as described in more detail below. Some of the instructions output by the AVCS 140 can be delivered directly to the powertrain 150, brakes 152, steering 154, signaling 170, etc., whereas other instructions output by the AVCS 140 are first delivered to the vehicle electronics 160, which generate commands to the other components of the vehicle.

In one example, the AVCS 140 can determine that an obstacle identified by the data processing system 130 is to be avoided by decelerating the vehicle until a safe speed is reached, followed by steering the vehicle around the obstacle. The AVCS 140 can output instructions to the powertrain 150, brakes 152, and steering 154 (directly or via the vehicle electronics 160) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain 150, brakes 152, and steering 154 to resume the previous speed settings of the vehicle.

A vehicle (e.g., a truck) traveling over a long-distance route incurs significant costs in fuel, vehicle depreciation, wearable components (e.g., tires, oil, fluids), and so on. The costs of operating the vehicle depend substantially on the vehicle's aerodynamic performance, e.g., a force of air resistance to the moving vehicle. Air resistance depends on the size and shape of the vehicle and the vehicle's speed. Sharp edges and curves result in turbulence that disrupt an air flow around the vehicle and make it more turbulent. The undercarriage of the truck has multiple parts (e.g., elements of suspension, axles, gearboxes, transmission, differentials, sway bars, protective shields, etc.) that are prone to causing air flow disruption. Therefore, reducing the amount of air flow underneath the body of the truck can reduce the amount of turbulence and, consequently, decrease the overall air resistance and the fuel consumption required to sustain a cruising highway speed of the vehicle.

Autonomously driven trucks have an advantage over driver-operated trucks in that ride quality may not be a significant concern for ADTs (although ride quality can be a factor for vehicle wear and cargo protection). Therefore, a suspension of an ADT can be adjusted to ensure a low height of the ADT above the road while the stiffness of the suspension can be increased to reduce travel and potential impact with the ground. The lowered position of the ADT allows to reduce the degree of the air flow (and the resulting turbulence generation) underneath the ADT while the stiffened suspension ensures that road roughness does not cause contact of the ADT undercarriage with the surface of the road. Smoother road surfaces enable lower positioning of the ADT. Conversely, roads that have bumps, potholes, and/or any other kinds of unevenness may require higher positioning of the ADT.

Figure 1B:
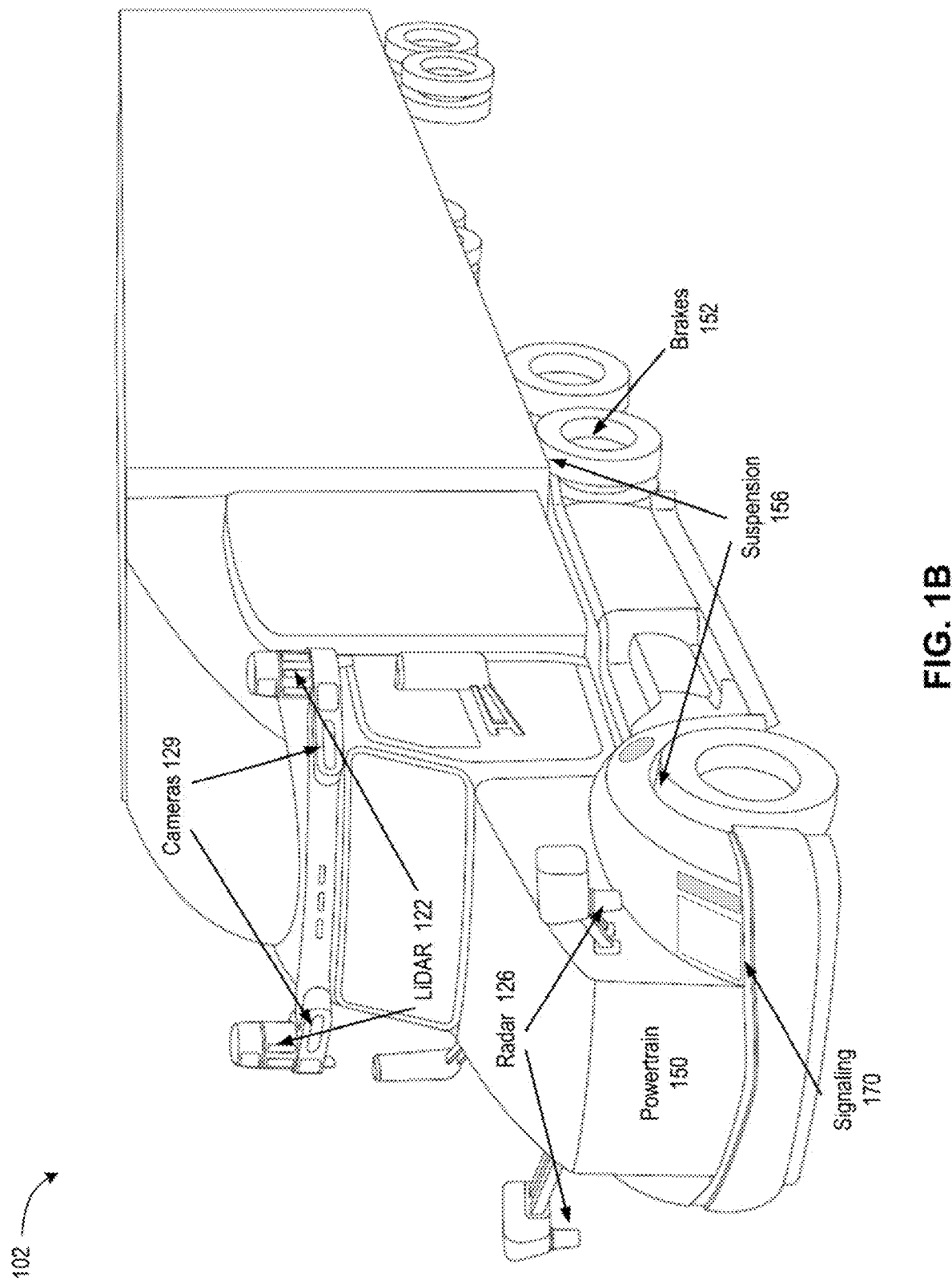
FIG. 1B is a schematic depiction of an autonomously driven truck capable of performing one or more described techniques, in accordance with implementations of the present disclosure.
Figure 2:
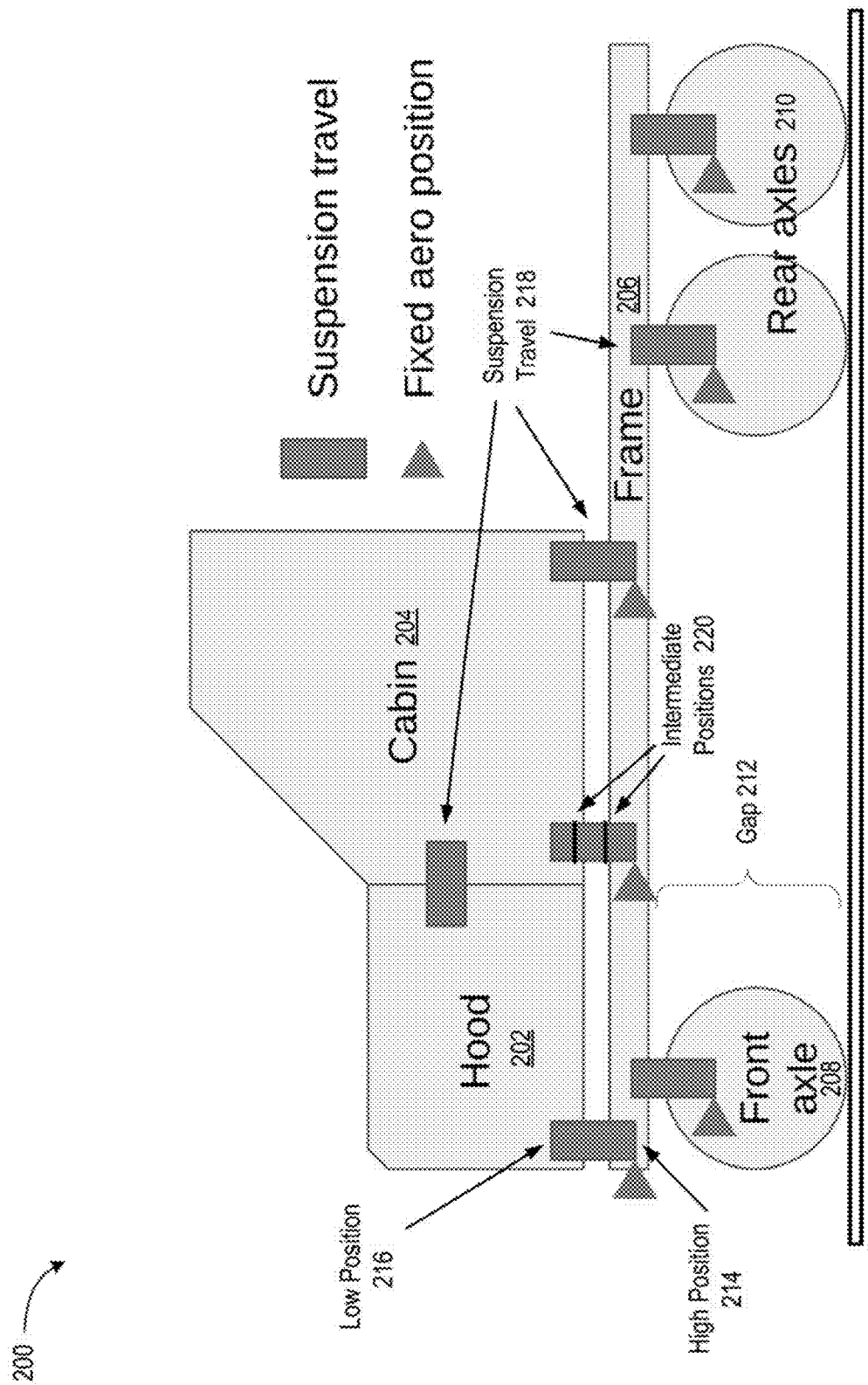
FIG. 2 is a schematic depiction of an autonomously driven truck capable of suspension adjustments in response to detection, by a sensing system of the autonomously driven truck, of changing road conditions, in accordance with some implementations of the present disclosure.

FIG. 1B is a schematic depiction of an autonomously driven truck capable of performing one or more described techniques, in accordance with implementations of the present disclosure. Depicted schematically are some of the systems of the autonomously driven truck 102, such as lidar(s) 122, radar(s) 126, camera(s) 129, powertrain 150, brakes 152, suspension 156, signaling 170. Numerous other systems are not indicated, for conciseness FIG. 2 is a schematic depiction of a autonomously driven truck 200 capable of suspension adjustments in response to detection, by a sensing system of the autonomously driven truck, of changing road conditions, in accordance with some implementations of the present disclosure. Depicted are hood 202 and cabin 204 of the ADT 200 that can be suspended at various positions relative to frame 206 (as depicted by vertical rectangles indicating vertical suspension travel 218) and relative to each other (as depicted by the horizontal rectangle). In turn, frame 206 can be suspended at various positions relative to front axle 208 and rear axles 210 resulting in different possible sizes of gap 212 between frame 206 and ground. When the bottoms of the vertical rectangles are aligned with the triangles, ADT 200 assumes the highest position 214 causing a larger air resistance and does not allow much suspension travel anymore. When the tops of the vertical rectangles are aligned with the triangles, ADT 200 assumes the lowest position 216 that has a smaller air resistance and does not allow much suspension travel anymore. Suspension travel 218 can allow fixing the nominal suspension position at two predetermined positions (e.g., "low" and "high") or between three or more predetermined positions, e.g., with one or more intermediate positions 220. Suspension travel can depend on the stiffness of the suspension. For example, a high stiffness can be selected for a position that is closer to the limits (e.g., bottom or top) of the adjustable height and allows a smaller suspension travel. Similarly, a lower stiffness can enable a nominal suspension position that is away from the height limits and allows a larger suspension travel. In some implementations, suspension travel 218 can change continuously between high position 214 and low position 216, based on settings of suspension 156 determined by the suspension settings module (SSM) 137 of the data processing system 130 and implemented by the AVCS 140.

Implementations disclosed herein address the problem of optimization of ADT positioning relative to the road surface by describing a suspension whose parameters (e.g., height and stiffness) can be dynamically adjusted based on the output of the vehicle's sensing system 120 and data processing system 130. The sensing system 120 can measure, e.g., using one or more lidar(s) 122 and/or camera(s) 129, the profile of the road surface and can detect presence (or absence) of various road surface imperfections—potholes, ruts, bumps, indentations, troughs, rocks, loose gravel, and the like. For example, the sensing system 120 can identify distances and directions to various reflecting points on the road surface and provide the identified distances and directions to the data processing system 130 and the perception system 132. The perception system 132 can determine that certain reflecting points are located below or above the average level of the road surface and can further identify the type of the surface imperfection (e.g., an indentation or a bump) and size (e.g., depth or height) of the imperfection. The perception system 132 can further identify a density of the imperfections (a number of imperfections per unit of distance along the road) and the distance from ADT to the imperfections.

In the instances where SSM 137 of the environment monitoring and prediction component 136 determines that ADT can avoid driving over the imperfections (e.g., the imperfections are sufficiently sparse or closely clustered and the traffic is sufficiently light to allow ADT to change lanes and/or drive around the imperfections, the data processing system 130 can provide corresponding instructions to the AVCS 140, and the AVCS 140 can send the signals to steering 154 (and, in some instance, powertrain 150 and/or brakes 152) to execute one or more maneuvers to avoid the road imperfections or drive over the imperfections (possibly, at a reduced speed) without changing the parameters of the suspension. In some instances, however, SSM 137 can determine that the imperfections are spread over a substantial length of the roadway (e.g., a rough surface extending to the limits of lidar visibility), and/or that the imperfections are too deep (high), or too numerous. The data processing system 130 and/or SSM 137 can then provide instructions to the AVCS 140 to change parameters of suspension 156, e.g., to raise ADT while reducing the stiffness of the suspension. Responsive to receiving such instructions and the new suspension settings, the AVCS 140 can output control signals to suspension 156 to decrease stiffness of the suspension and to increase the height of the ADT relative to the ground.

In some implementations, after a road imperfection or a cluster of imperfections have caused the AVCS 140 to increase gap 212 and decrease stiffness of suspension 156, the AVCS 140 can (absent indications from the data processing system 130 that other road imperfections are forthcoming) decrease the gap 212 again and increase stiffness of suspension for improved aerodynamic performance. The low position of the ADT can be maintained until the sensing system 120 detects new substantial road imperfections that are substantial enough to trigger a new repositioning of the ADT (e.g., raising the ADT) and a re-adjustment (e.g., softening) of suspension settings.

In some implementations, the environment monitoring and prediction component 136 can determine that the average rate of appearance of imperfections (and the ensuing adjustments of suspension 156) does not justify the improved aerodynamic performance. For example, the environment monitoring and prediction component 136 can compare the known cost (e.g., energy/fuel equivalent cost) of one lower-then-raise suspension cycle to an aerodynamic gain achieved over an average distance traveled in the low position 216, and determine that the gain is lower than the cost. In such instances, data processing system 130 can output instructions to the AVCS 140 to maintain suspension 156 in the high position. Periodically, the data processing system 130 and/or the environment monitoring and prediction module 136 can reassess the road conditions, including an updated rate at which the road imperfections appear. Responsive to determination that the rate has decreased, the environment monitoring and prediction module 136 can determine that the gain has exceeded the cost and can instruct the AVCS 140 to transition to the low position driving mode (with occasional reconfiguration of the suspension to the high position, as needed to respond to an occasional imperfection).

In some implementations, scans determine that the average size and rate of road imperfections does not justify maintaining ADT in the high position but also does not allow keeping ADT in the low position. SSM 137 can then compute an intermediate height of the ADT and other intermediate suspension settings (e.g., stiffness) that are sufficient to negotiate the average encountered imperfections while still achieving an aerodynamic net efficiency gain. In those instances where the environment monitoring and prediction component 136 identifies a larger-than-average road imperfection, the data processing system 130 can still make on-the-fly adjustment of the suspension (e.g., temporarily raising the ADT) from the intermediate position before returning the suspension settings to the intermediate values once the larger-than-average road imperfection is passed.

While in some implementations, the stiffness of the suspension can correlate negatively with the height of the ADT, in other implementations, only the height can be adjusted whereas the stiffness of the suspension can be fixed. In such implementations, as the height of the ADT is lowered (e.g., in response to improved quality of the road surface), an occasional surface imperfection can cause an engagement of bump stops of the suspension (designed to prevent damage to the vehicle). In some implementations, SSM 137 can nonetheless tolerate such an engagement: although in a conventional driver-operated vehicle hitting bump stops results in a lowered ride quality, an autonomously driven vehicle can (to a certain degree) be more immune to ride quality concerns. In some implementations, SSM 137 can keep track of how often (and how intensely) bump stops are engaged. If frequency of such engagement (and/or intensity, or some combined metric) exceeds a threshold quantity, SSM 137 can adjust the suspension (e.g., by making it more stiff) to prevent additional wear and tear of the bump stops or other components of the suspension and/or the vehicle frame.

In some implementations, the road conditions data can be stored by the environment monitoring and prediction component 136 as part of map information 135, for future use. The road conditions data can include statistical data about road imperfections, such as the data characterizing a type (e.g., bump, pothole, trough, coarse surface, etc.), a size (e.g., profile, height, depth, etc.), density per unit of distance, and the like. The statistics can include the average values (e.g., the average, size and density of each type of imperfection) as well as standard deviations (second moments), skewness (third moments), kurtosis (fourth moments), and so on. In some implementations, historical data about the road conditions can be available within map information 135 (e.g., from prior driving missions along the same route) and accessible to the environment monitoring and prediction component 136. By using the historical data (from prior driving missions by the same or other ADTs), the prediction horizon for comparison of the cost of dynamic suspension adjustment to savings due to lower drag can be extended beyond a sensing range of the ADT. In some implementations, the environment monitoring and prediction component 136 can select the initial suspension settings for the upcoming section of the road based on map information data 135. The data from the sensing system 120 can then be used to verify how current the historical data is. If the historical data differs from the current data supplied by the sensing system 120 (e.g., the road section has deteriorated or, conversely, has been resurfaced), the environment monitoring and prediction component 136 can overrule (or even scrape) the historical data and rely mostly (or solely) on the current (run-time) data. Additionally, the environment monitoring and prediction module 136 can update (e.g. overwrite) the data about the current road section in map information 135 and also (optionally) share the updated data with other vehicles, e.g., using one or more wireless network connections or upon arrival of the ADT to an ADT station.

Figure 3A:
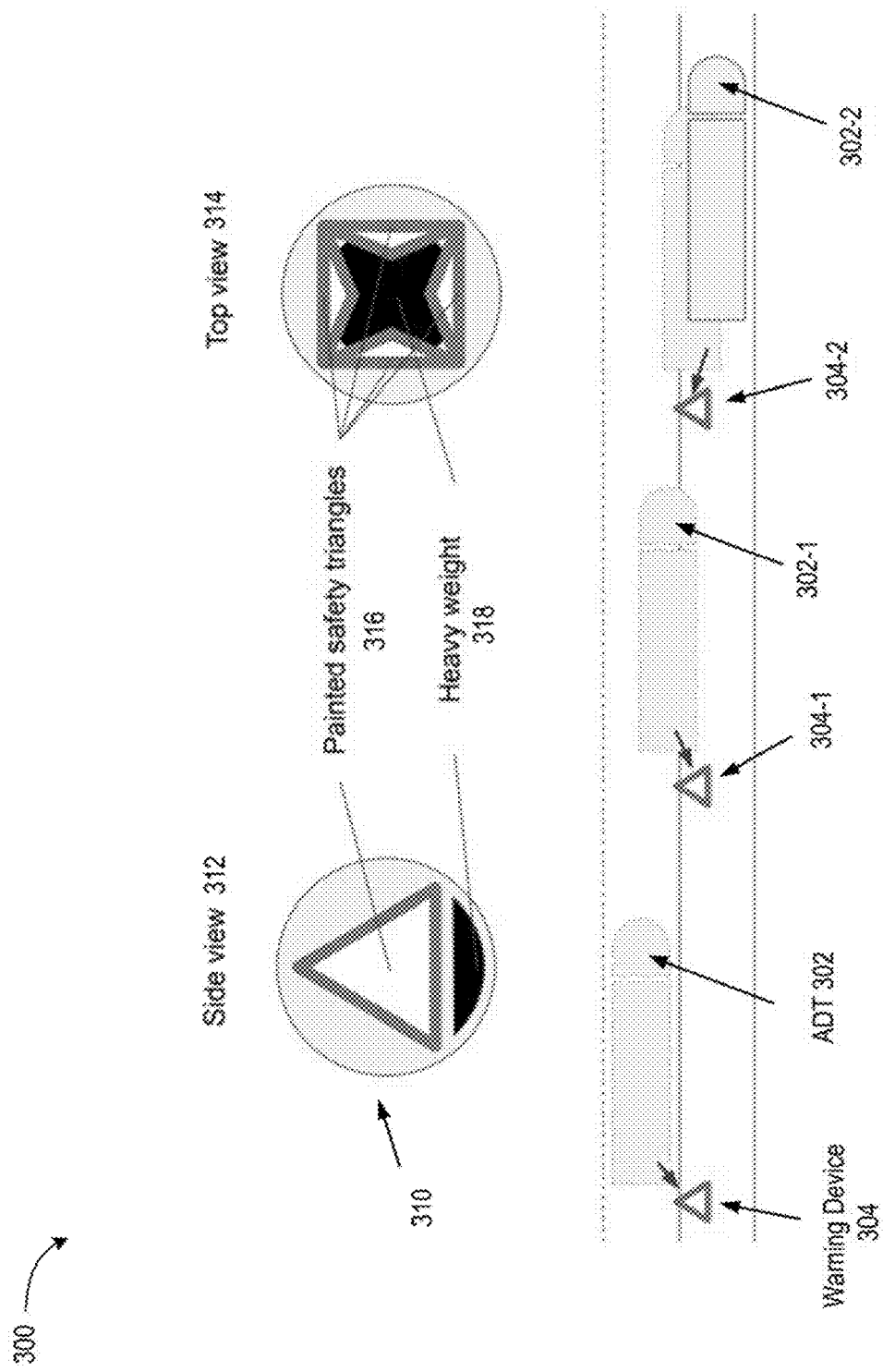
FIG. 3A is a schematic depiction of a process of automated placement of warning devices by a stopping and then stopped autonomously driven truck, in accordance with some implementations of the present disclosure.

FIG. 3A is a schematic depiction of a process 300 of automated placement of warning devices by a stopping and then stopped autonomously driven truck, in accordance with some implementations of the present disclosure. An autonomously driven commercial vehicle, e.g., ADT 302, can be required to be marked with warning devices (also known as warning triangles, safety triangles, emergency devices, and so on) when the vehicle is stranded or stopped on the shoulder (or within a lane) of the road, to warn other vehicles of the vehicle's presence. Typically, the vehicle is required to be marked with at least one warning device placed behind the vehicle (e.g., at a distance of about 100 feet) on a divided highway and, additionally, at least one warning device placed ahead of the vehicle on an undivided highway. Autonomous vehicles lack human assistance that would ensure a timely placement of the warning devices (often, the warning devices have to be placed expeditiously, e.g., within 10 minutes from stopping).

Implementations of the instant disclosure describe methods of placement of warning devices behind a stopping vehicle using the inertia of the motion of the vehicle. Depicted in FIG. 3A is ADT 302 that has made a decision to stop on the shoulder of a divided highway. The decision can be a result of a mechanical issue (e.g., a blown tire or a failed component of the vehicle), a safety issue (a displaced cargo), a weather issue (heavy snow and/or ice on the road ahead), a traffic issue (accident or road closure), and the like. Having made the decision to move to the shoulder of the road, the AVCS 140 can begin deployment of a warning device 304 by releasing warning device 304 to the road (e.g. by opening a gate of the warning device repository). The deployed (e.g., released, dropped, pushed, etc.) warning device 304 can continue to move forward with a decreasing speed (e.g., as a result of friction from the road surface). Accordingly, as ADT 302 decelerates (position 302-1) and eventually comes to a full stop (position 302-2), the warning device follows ADT (position 304-1) and comes to a stop (position 304-2) at approximately the correct distance behind ADT.

In some implementations, warning device 304 can be capable of rolling on the road surface, e.g., can be of a spheroidal form (though not necessarily of a perfect spherical form) or a cylindrical form, etc., to facilitate rolling over the road surface. In some implementations, the surface of warning device 304 can intentionally be made rough, to facilitate higher friction with the road and, consequently, faster stopping of warning device 304. In some implementations, warning device 304 can be deployed from the back of the trailer, to prevent warning device 304 from being run over by the wheels of ADT 302. In some implementations, warning device 304 can be deployed from the back of the tractor but be made of such a material that is capable of restoring its shape after being run over. For example, warning device 304 can be made of a foam-like material, or any other material capable of restoring shape after a substantial deformation. To increase the likelihood of a correct placement of warning devices, multiple warning devices 304 can be deployed at the same time or one after another, e.g., at spaced time intervals.

Deployment of warning device(s) 304 can be controlled by automated emergency signaling (AES) 172 module of the signaling 170 of ADT 302. In some implementations, AES 172 can be implemented as part of the AVCS 140 or as a separate module (communicatively coupled to the AVCS 140) that can be mounted on the trailer of ADT rather than on the tractor (for more precise and fast placement of warning devices). Once the AVCS 140 has made a decision to stop ADT 302, AVCS 140 can output corresponding instructions to powertrain 150 (to reduce rpm and to begin gear downshifting), to brakes 152 (to start braking), and to steering 154 (to move ADT 302 over to the shoulder of the road). Moreover, AVCS 140 can output instructions to the signaling 170 to turn on turning lights, emergency flashing lights, stopping lights, and so on. AVCS 140 can also instruct AES 172 to begin deployment of warning device(s) 304. Additionally, AVCS 140 can provide AES 173 with an anticipated deceleration schedule (e.g., averaged expected deceleration, time of stopping, distance to full stop, and so on). Based on the received deceleration schedule, AES 173 can deploy warning device(s) 304 immediately or after a calculated time delay, e.g., to ensure that warning device(s) 304 are not placed too far behind position 302-2 the stopped ADT.

Sensing system 120 can detect motion of deployed warning device(s) 304, and data processing system 130 can provide the AVCS 140 with tracking information for the deployed warning device(s) 304. Based on the provided tracking information, the AVCS 140 can change deceleration schedule to ensure that deployed warning device(s) 304 come to stop within an acceptable range (e.g., 10 feet, 20 feet, etc.) around a target distance (e.g., 100 feet, 50 feet, etc.) from the stopped ADT 302-2. For example, if the estimated stopping position 304-1 of the warning device is outside the acceptable range, e.g., too close to an estimated stopped ADT position, the AVCS 140 can change the deceleration schedule by releasing brakes to adjust position of the stopped ADT 302-2. Similarly, if the estimated stopping position 304-1 of the warning device is outside the acceptable range and too far behind ADT 302-2, the AVCS 140 can change the deceleration schedule by braking harder. In some implementations, after both ADT 302-2 and the warning device 304-2 have come to a stop, and it is determined by the data processing system 130 that the warning device 304-2 is too far behind, ADT 302-2 can choose a period of time when traffic is light or absent, and back up towards the warning device 304-2 until the target distance is achieved.

One illustrative non-limiting example of a warning device 310 is shown in FIG. 3A. Depicted is a spherical (or spheroidal) warning device 310 with safety content (e.g., safety triangles 316) painted (or affixed) thereon, as depicted by the side view 312. Multiple instances of safety content can be painted (or affixed) to the warning device 310, for improved visibility. The depicted symbols can be of reflective material or paint to further improve visibility especially at night. As a result, notwithstanding the final orientation of the stopped warning device 310, safety content can be visible to vehicle traffic. For example, as depicted in the top view 314 of the warning device 310, four safety triangles are painted on (or affixed to) warning device 310 (although any other number is possible, too—e.g., three, five, etc.). Warning device 310 can have an asymmetric weight distribution to ensure a desired orientation of the stopped warning device. In the depicted example, a weight 318 can (optionally) be added to the bottom of warning device 310 to ensure that warning device 310 comes to a stop with the vertices of safety triangles pointing up.

In some implementations, as depicted in FIGS. 3B-E, AES 172 can deploy multiple warning devices at two (or more) different instances of time. FIG. 3B illustrates a deployment of a first warning device 304 by ADT 302 at a first time. In some implementations, ADT 302 may have already started deceleration before the first time. For example, ADT 302 may have slowed down from cruising speed of 65 mph to 20 mph. A second warning device 306 may be prepared for deployment, but not deployed yet, while ADT continues its decelerated motion. FIG. 3C illustrates a deployment of a second warning device 306 by ADT 302 at a second time. By the second time, ADT 302 may have slowed down even more. For example, ADT 302 may be moving with 10 mph speed. FIG. 3D illustrates positioning of first warning device 304, second warning device 306, and ADT 302 by the time all three objects have stopped. FIG. 3E illustrates a final positioning of ADT 302 relative to first warning device 304 and second warning device 306. More specifically, once both the first and the second warning device(s) have come to a stop, ADT 302 can make a provisional stop ahead of the stopped warning device 306, wait for a period of light traffic or no traffic and then back up into a position between the two warning devices (or between any set of two of warning devices, if multiple devices were deployed at each instance of time). Warning device 306 can be made of a deformable material, in case ADT 302 has to ride over the devices). As a result, warning device(s) 304 deployed at a first instance of time serves as a rear warning device and warning device(s) 306 deployed at a second instance of time serves as a forward warning device. Such a placement of warning devices can be used if the warning devices are configured to decelerate faster than ADT 302.

In some implementations, the warning devices can be configured to decelerate slower than ADT 302 and can, therefore, overtake ADT 302 while the latter is stopping or, alternatively, the first warning device can be deployed from a storage located near the front end of ADT 302. In such implementations, ADT 302 can drive forward (instead of backing up) to assume position between two stopped warning devices. In some implementations, first warning device 304 can be configured to decelerate slower than ADT 302 whereas second warning device 306 can be configured to decelerate faster than ADT 302. In such implementations, first warning device 304 can stop ahead of ADT 302 and second warning device 306 can stop behind ADT 302, and no driving over a warning device may be needed. In some implementations, ADT 302 may monitor positions of two (or more) warning devices to ensure that the ADT is within a prescribed legal interval of distances from the warning devices.

Figure 4A:
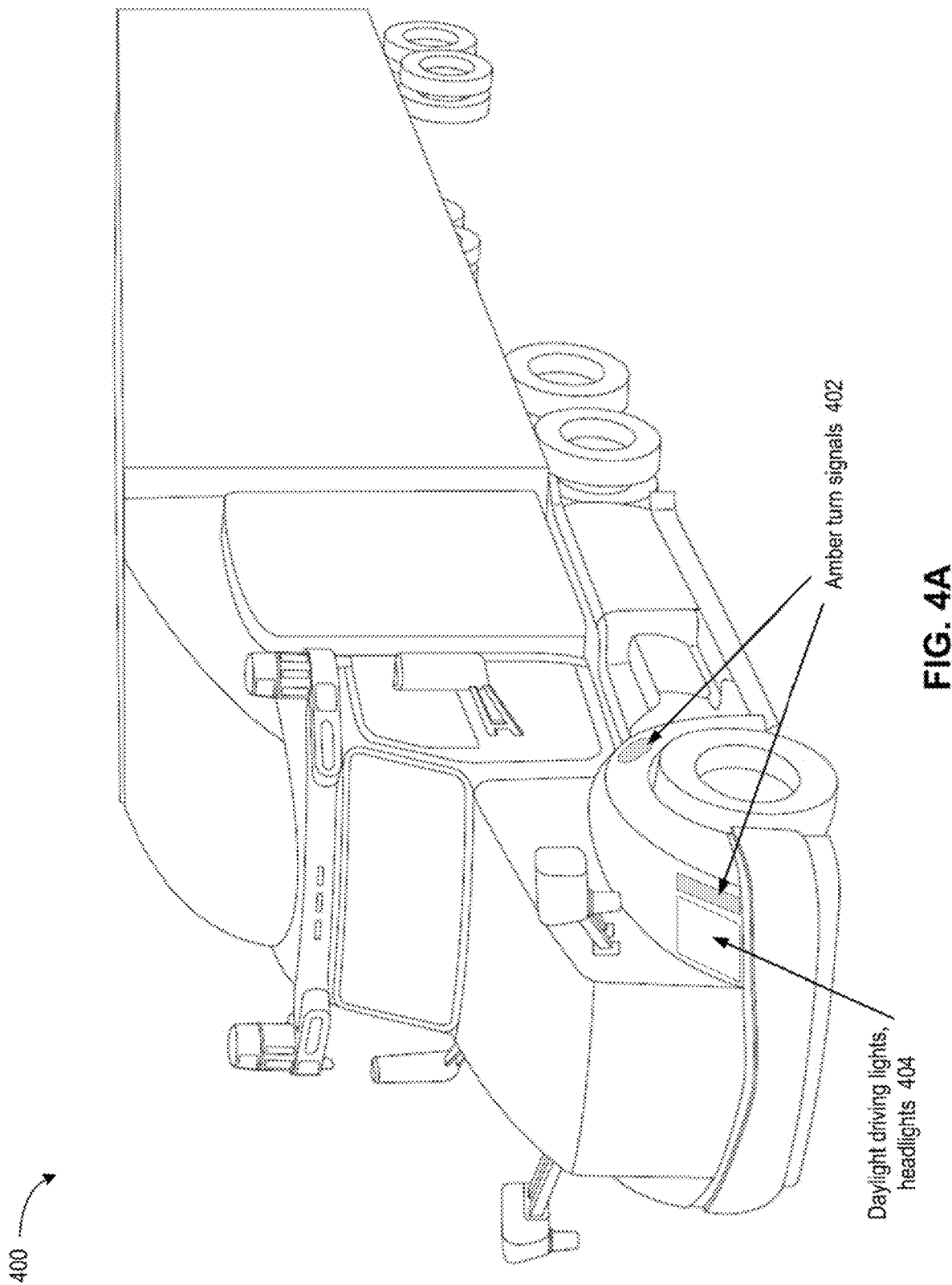
FIG. 4A is an illustration of positioning of lighting devices for enhanced illumination of stranded and stopped autonomous driving trucks, in accordance with some implementations of the present disclosure.
Figure 4B:
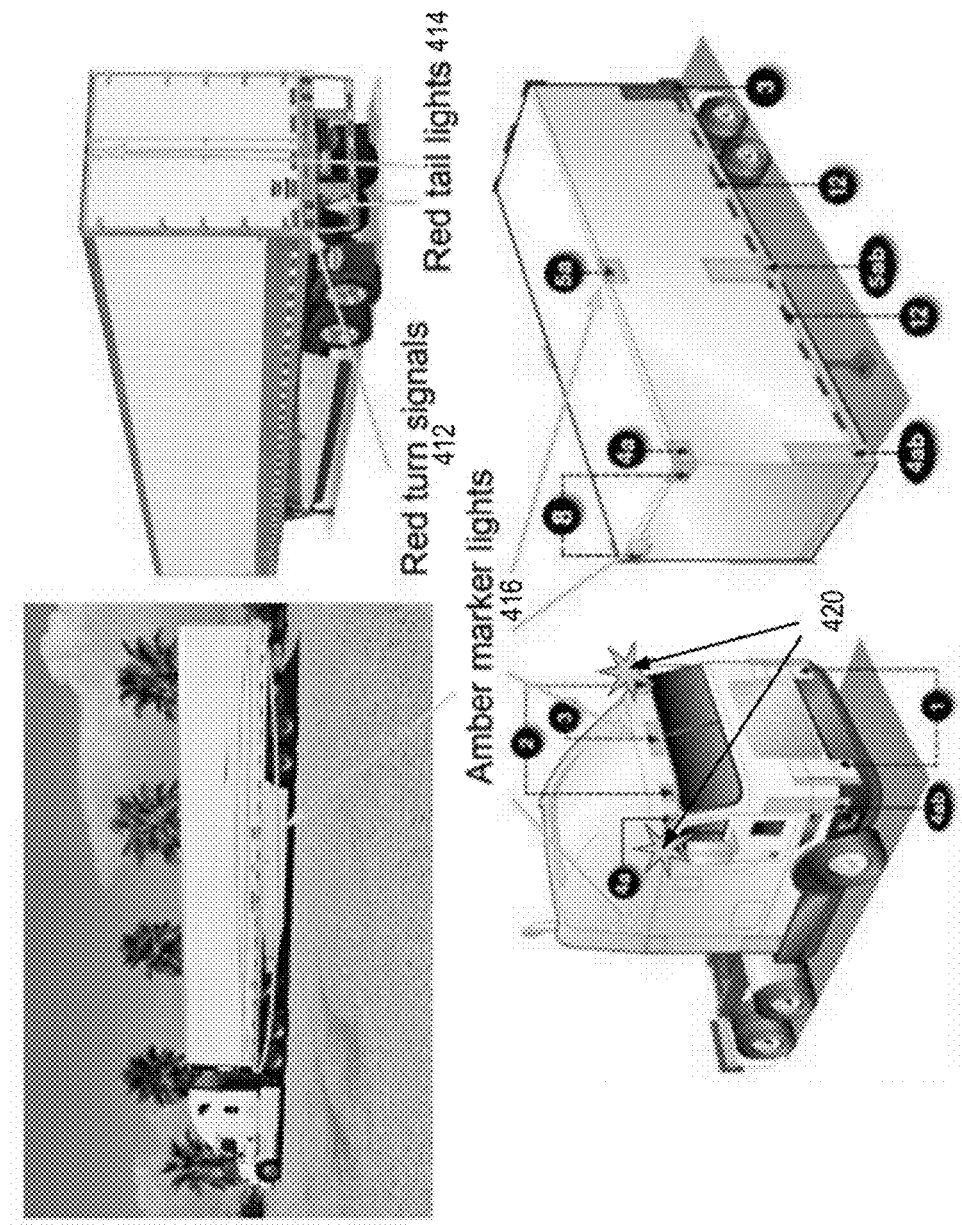
FIG. 4B is another illustration of positioning of lighting devices for enhanced illumination of stranded and stopped autonomous driving trucks, in accordance with some implementations of the present disclosure.

FIG. 4A is an illustration of positioning of lighting devices for enhanced illumination of stranded and stopped autonomous driving trucks, in accordance with some implementations of the present disclosure. Instead of (or in addition to) placing warning devices ahead and/or behind a stranded or stopped vehicle, implementations of the present disclosure identify methods of using illumination devices already available on ADTs (as well as additional illuminations devices) for marking ADT and identification of stopped ADT to other traffic participants. Existing illumination devices can include, with reference to FIG. 4A, amber turn signals 402, daylight driving lights/headlights 404, emergency lights (not identified in FIG. 4A). FIG. 4B is another illustration of positioning of lighting devices for enhanced illumination of stranded and stopped autonomous driving trucks, in accordance with some implementations of the present disclosure. As shown in FIG. 4B, existing illumination devices can further include, red turn signals 412, (lower and upper) red tail lights 414, amber marker lights 416, and other lights (not shown).

Presently, steady lights (with the exception of blinking emergency lights) are used for stopped or stranded vehicles. However, people tend to respond more attentively to flashing lights (which are often used to identify construction vehicles) rather than to steady lights. Disclosed implementations use some or all of the following: driving lights/headlights 404, red turn signals 412, red tail lights 414, amber marker lights 416, and so on. Different flashing patterns can be used, e.g., 2 seconds on followed by 2 seconds off, or any other flashing pattern, such as S-O-S pattern (three shorts signals followed by three long signals followed by three more shorts signals and then a pause). Different lights can be flashed using different patterns. For example, red turn signals 412 and red tail lights 414 can be flashed (on-off) every 2 seconds whereas amber marker lights 416 can be flashed every 1 second. In some implementations, some of the amber marker lights 416 can be flashed differently than other amber marker lights. For example, amber marker lights located on the tractor can be flashed differently than amber marker lights located on the trailer. Likewise, amber marker lights located near the middle of the trailer can be flashed differently than amber marker lights located near the ends of the trailer. Amber marker lights located near the bottom of the tractor can be flashed differently than the lights located near the top of the tractor, and so on.

In some implementations, additional high luminance lights 420 (e.g., amber lights or lights of any other color) can be placed at locations that enable enhanced visibility to outside vehicles. Such enhanced visibility can be achieved, for example, by placing high luminance lights 420 on top of sensors of the sensing system 120, which can be located on top (or in place) of rear view (side) mirrors. Such a location of high luminance lights 420 can be advantageous by providing an efficient combination of a reasonably high elevation (only somewhat lower than the top of the cabin) and a laterally-extended position that is minimally obscured by the sides of the trailer and, therefore, is highly visible from large distances. The additional high luminance lights 420 can also be used in the flashing mode with a flashing pattern that is similar or different than the flashing patterns of other lights. In some implementations, high luminance lights 420 can be rotating instead of flashing. Various types of light sources can be used in high luminance lights 420, e.g. halogen bulbs, light-emitting diodes, or any other types of lights sources.

In some implementations, high luminance lights 420 can be directed outwards, toward the oncoming traffic. In some implementations, high luminance lights 420 can be directed (partially or fully) inwards, towards the sides of the trailer. On one hand, such an inwards direction of light can prevent blinding of drivers of other vehicles. On the other hand, directing high luminance lights 420 inward can result (especially, coupled with the flashing character of the lights) in a strong illumination of the sides of the trailer visible to drivers of other vehicles at significant distances from ADT.

In some implementations, patterns of flashing/steady lights in conjunction with specific types/placement/colors of lights can be used to distinguish (e.g., via eventual federal and/or state regulations) autonomously driven trucks from driver-operated vehicles.

FIGS. 5-8 depict flow diagrams illustrating methods 500-800 of operating a suspension system and a signaling system of autonomously driven trucks for improved efficiency and safety of trucking operations, in accordance with some implementations of the present disclosure. Methods 500-800 described below, and/or each of their individual functions, routines, subroutines, or operations can be performed by a processing device, having one or more processing units (CPU) and memory devices communicatively coupled to the CPU(s). In certain implementations, each of methods 500-800 can be performed using a single processing thread. Alternatively, each of methods 500-800 can be performed using two or more processing threads, each thread executing one or more individual functions, routines, subroutines, or operations of the method. In an illustrative example, the processing threads implementing each of methods 500-800 can be synchronized (e.g., using semaphores, critical sections, and/or other thread synchronization mechanisms). Alternatively, the processing threads implementing each of methods 500-800 can be executed asynchronously with respect to each other. Various operations of each of methods 500-800 can be performed in a different order compared with the order shown in FIGS. 5-8. Some operations of the methods can be performed concurrently with other operations. Some operations can be optional.

Figure 5:
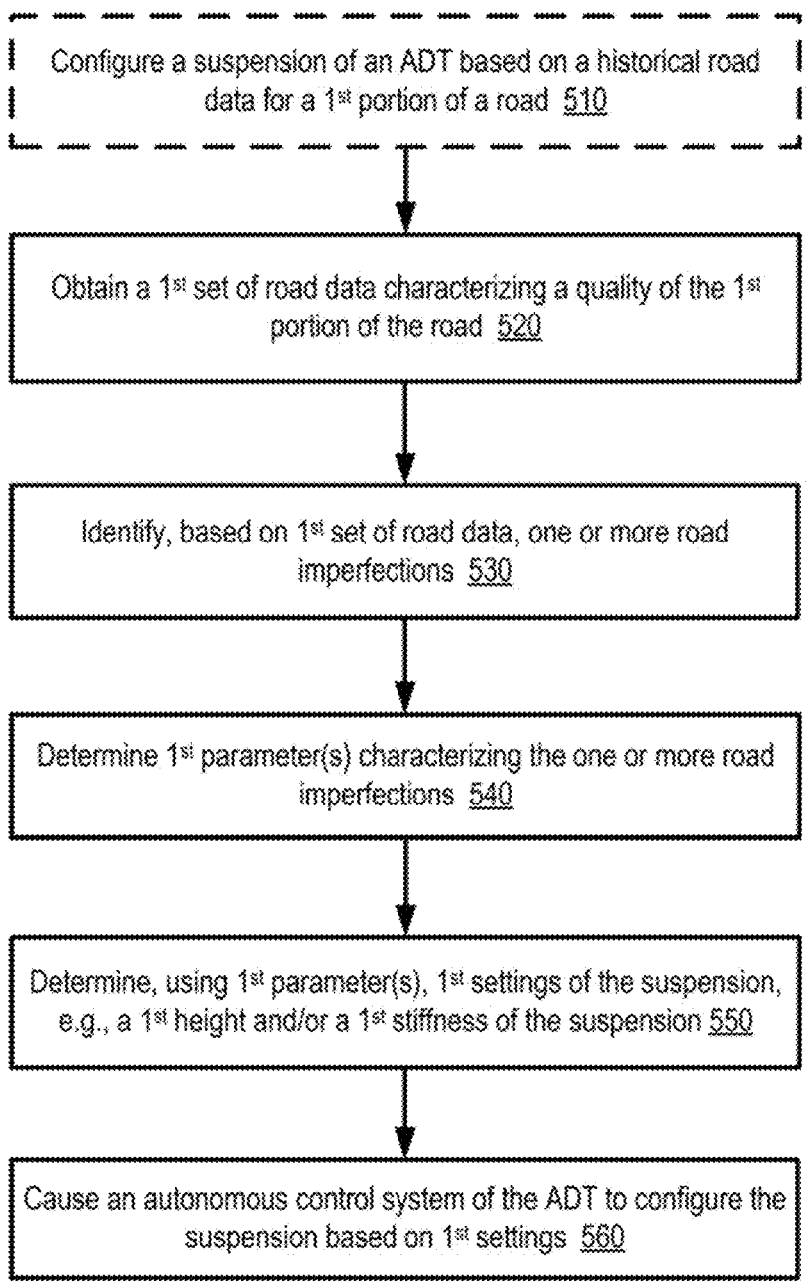
FIG. 5 depicts a flow diagram of an example method of suspension adjustments in response to detection of road imperfections, in accordance with some implementations of the present disclosure.

FIG. 5 depicts a flow diagram of an example method 500 of suspension adjustments in response to detection of road imperfections, in accordance with some implementations of the present disclosure. Method 500 can be performed by various systems of an ADT, which can be ADT 100 of FIG. 1A, ADT 200 of FIG. 2, and the like. Method 500 can be used to balance the economy of trucking missions against wear on all components of the ADT. The processing device(s) performing method 500 can execute instructions from various components of the AV, e.g., driving trajectory control module (DTCM) 133, suspension settings module (SSM) 137, or any other suitable component of data processing system 130. Method 500 can be performed while the AV is moving, e.g., on a highway, on a city street, while traveling on any road (e.g., a rural road), off-road, and the like. During travel of the AV, the AV can encounter road imperfections that can put undesired stresses on the suspension of the AV. Method 500 can be used for optimal handling of such road imperfections.

In some implementations, as depicted with an optional block 510, prior to identifying road imperfections, the suspension of the ADT can be configured based on a historical road data for a particular portion of the road traveled by the ADT. For example, the historical data can be collected by the ADT during previous missions, by various ADTs that belong to the same truck fleet (or company), or by any other vehicles that have driven the same portion of the road, e.g., passenger vehicles, scout vehicles, maintenance vehicles, etc. The historical data can indicate an average quality of the road surface (e.g., a density of potholes, bumps, dents, etc.) and the suspension configuration (e.g., height and stiffness) can be set based on this average quality.

At block 520, method 500 can include obtaining, using a sensing system of the ADT (e.g., sensing system 120), a first set of road data characterizing a quality of a first portion of the road. In some implementations, the first set of road data can be obtained from a dispatch center or a vehicle that is different from the ADT, e.g., a vehicle that has already traveled over the first portion of the road and communicated the first set of road data to the ADT (e.g., directly or via the dispatch center). The first portion of the road can be any section of the road that is observable by sensors of the sensing system, such as lidars, radars, cameras, etc., or any section of the road for which the data can be available using other sources (e.g., from a dispatch or a driving mission control center). At block 530, method 500 can continue with identifying, using the data processing system of the ADT and based on the first set of road data, one or more road imperfections. For example, the first set of road data can include lidar data that maps the profile of the road surface. In some implementations, the first set of road data can include camera or radar images that confirm the existence of the road imperfections or provide additional information about the road imperfections.

At block 540, method 500 can continue with the processing system determining one or more first parameters characterizing the one or more road imperfections. For example, the data processing system can determine various parameters associated with the one or more road imperfections, such as a length, width, height (in the instance of a bump), a depth (in the instance of a rut), and so on. In some implementations, the parameters can include a maximum length/width/height/depth for a given imperfection, an average length/width/height/depth across a given imperfection, and the like. In some implementations, the parameters can include a number of the imperfections within the first portion of the road or per unit of area or length of the road. For multiple identified imperfections, the parameters can further include an average and/or maximum length/width/height/depth over all or some of the identified imperfections.

At block 550, the data processing system can determine, using the one or more first parameters, first settings of a suspension of the ADT. The first settings can include a first height of the suspension, a first stiffness of the suspension, a maximum suspension travel, and so on. In some implementations, the settings can be determined using a mathematical formula that inputs the parameters determined at block 540. In some implementations, a set of look-up tables can be used. The form of the mathematical formula or the content of the look-up tables can be determined based on empirical testing. In some implementations, the testing can be performed using conventional trucks (non-AV trucks) of the same type and model as the ADT. Various imperfections can be given a score (or multiple scores) estimating how significant an impact of the imperfections on the ADT is expected to be. For example, one score (metric) can characterize a total impulse experienced by the ADT or an axle of the ADT; the impulse being the integrated over time force applied to the ADT as a result of the imperfection. Another score can characterize the maximum force applied to the ADT in the course of driving over the imperfection. Yet another score can characterize the travel of the suspension in the course of driving over the imperfection (e.g., given the current settings of the ADT). In some implementations, the metrics can be an output by a physical model that simulates a process of a mechanical interaction of the ADT with the identified imperfections, based on the determined parameters.

In some implementations, the scores (metrics) can be output by a machine learning model (MLM). As an example, the MLM can be a neural network or a decision-tree model. In some implementations, the input into the MLM can include patches of data (e.g., cropped camera images and lidar/radar images) with depictions of the road imperfections. The output of the MLM can be one or more scores associated with classification of the imperfections. The MLM can be trained on similar data (e.g., camera images, lidar images, radar images, etc., of various road defects) annotated with target outputs, which can include classification scores determined by a truck engineer. The trained MLM can then be installed on the ADT, e.g., as part of the data processing system 130 and/or SSM 137. The installed MLM can be used for field inferences, e.g., determining scores (metrics) of actual road imperfections encountered by the ADT during driving missions. The determined scores can then be used to determine the setting of the suspension system. For example, upon determining the score(s) for one or a series of road imperfections, the data processing system can determine that to optimally drive over the imperfection(s), the ADT is to decrease the stiffness (to avoid excessive mechanical impact on the ADT). Additionally, the data processing system can determine that, to accommodate a larger travel of the suspension, the height of the suspension is to be raised.

At block 560, method 500 can continue with the data processing system causing an autonomous control system (e.g., AVCS 140) to configure the suspension of the ADT based on the first settings. For example, the height of the suspension can be raised while the stiffness may be reduced. In some implementations, in addition to changing the suspension settings, the autonomous control system can change (e.g., reduce) the speed of the ADT. In some instances, the autonomous control system can determine that the ADT can avoid (e.g., by performing a steering maneuver) driving over the biggest imperfection(s) and drive only over smaller imperfections. In such instances, the data processing system can ignore the biggest imperfections and process the smaller imperfections, as described above, and determine the settings of the suspension system based on the parameters characterizing the smaller imperfections.

Figure 6:
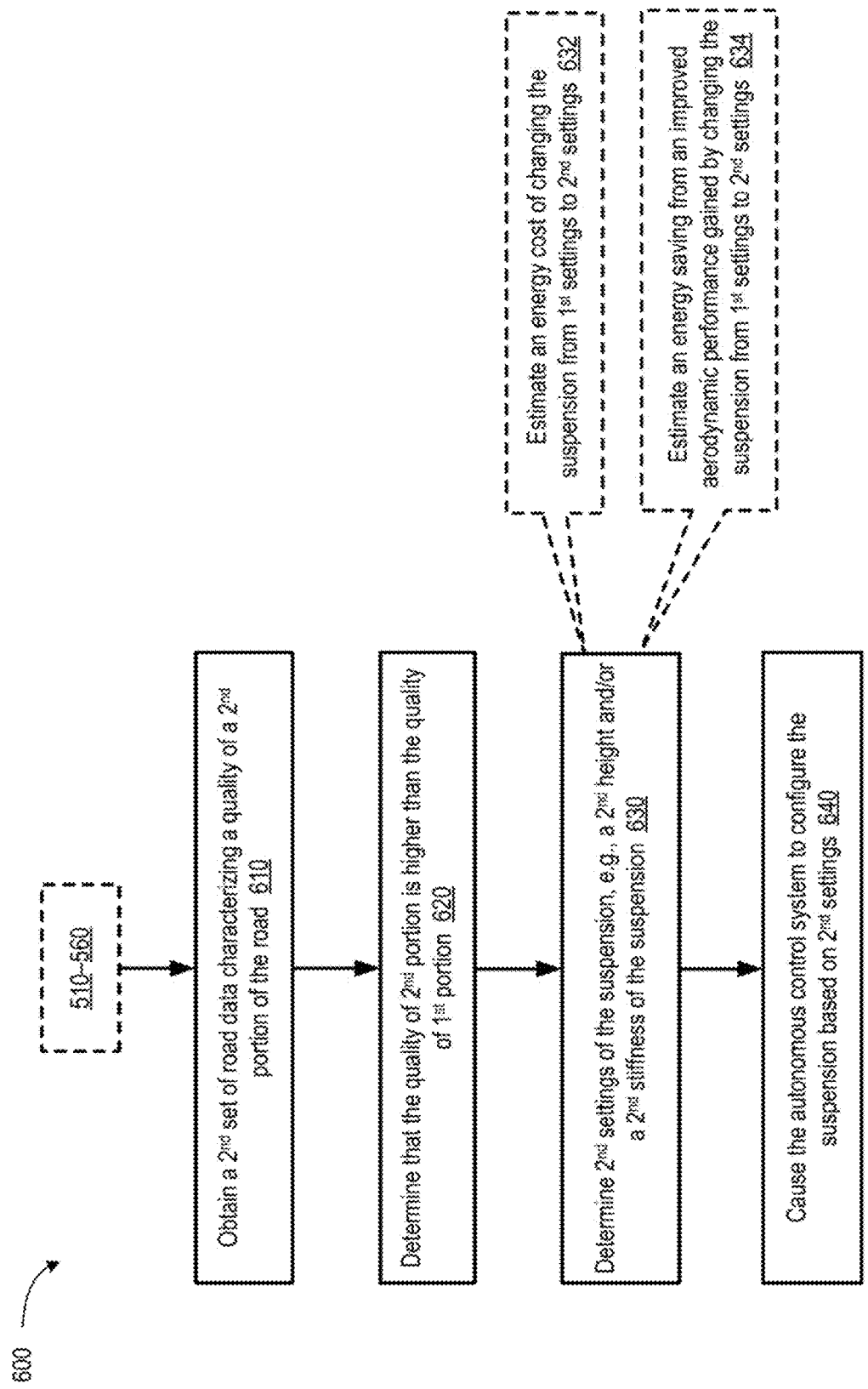
FIG. 6 depicts a flow diagram of an example method of suspension adjustments in response to detection of changing road conditions, in accordance with some implementations of the present disclosure.

FIG. 6 depicts a flow diagram of an example method 600 of suspension adjustments in response to detection of changing road conditions, in accordance with some implementations of the present disclosure. In some implementations, method 600 can be performed, as indicated by blocks 510-560, after performance of method 500, e.g., after the suspension of the ADT has been configured based on the first settings. As the ADT continues driving on the road, method 600 can continue at block 610, with the sensing system of the ADT obtaining a second set of road data. The second set of road data can characterize a quality of a second portion of the road traveled by the ADT, e.g., a portion of the road that is ahead (in the direction of the ADT travel) of the first portion. The second set of road data can include similar types of sensing data, e.g., lidar data, camera data, radar data, etc. The second set of road data can be collected similarly to how the first set of road data was collected, e.g., using a sensing system of the ADT, a sensing system of a different vehicle, from the dispatch center, or any combination thereof.

At block 620, method 600 can continue with the data processing system determining that the quality of the second portion of the road is higher than the quality of the first portion of the road. For example, the second portion of the road can have fewer imperfections, can have imperfections of lesser size (e.g., depth, height, length, etc.), a smaller number of imperfections per unit of distance traveled. At block 630, the data processing system can determine second settings of the suspension of the ADT. The second settings can include a second height that is lower than the first height. In some implementations, the second stiffness can be higher than the first stiffness.

In some implementations, as depicted by an optional block 632, determining the second settings of the suspension can include estimating an energy cost of changing the suspension from the first settings to the second settings. For example, changing the height of the suspension and changing the stiffness of the suspension can require electric motors of the suspension system to expend some amount of energy. In some implementations, as depicted with block 634, determining the second settings of the suspension of the ADT can further include estimating an energy saving from an improved aerodynamic performance gained by changing the suspension of the ADT from the first settings to the second settings. For example, the lower suspension can reduce the amount of aerodynamic drag and decrease fuel consumption. Because the energy savings increase with the distance (or time) driven, whereas the energy cost of suspension adjustment is a fixed value, to have a meaningful comparison, the energy saving can be computed for some reference distance of travel of the ADT. The reference distance can be an average distance between road imperfections of such a size (depth, length, etc.) that calls for suspension adjustments, e.g., for raising the height of the suspension to avoid excessive mechanical impact (e.g., above a predetermined threshold that depends on the type and model of the ADT). Such an average distance can be determined from the historical data for the driving mission being performed or from the data for a preceding part of the driving mission; e.g., based on the average distance between encountered imperfections of a certain minimum score.

At block 640, method 600 can continue with the data processing system causing the autonomous control system of the ADT to configure the suspension of the ADT based on the second settings. Such a reconfiguration of suspension can be performed as described in conjunction with block 560 of method 500.

Figure 7:
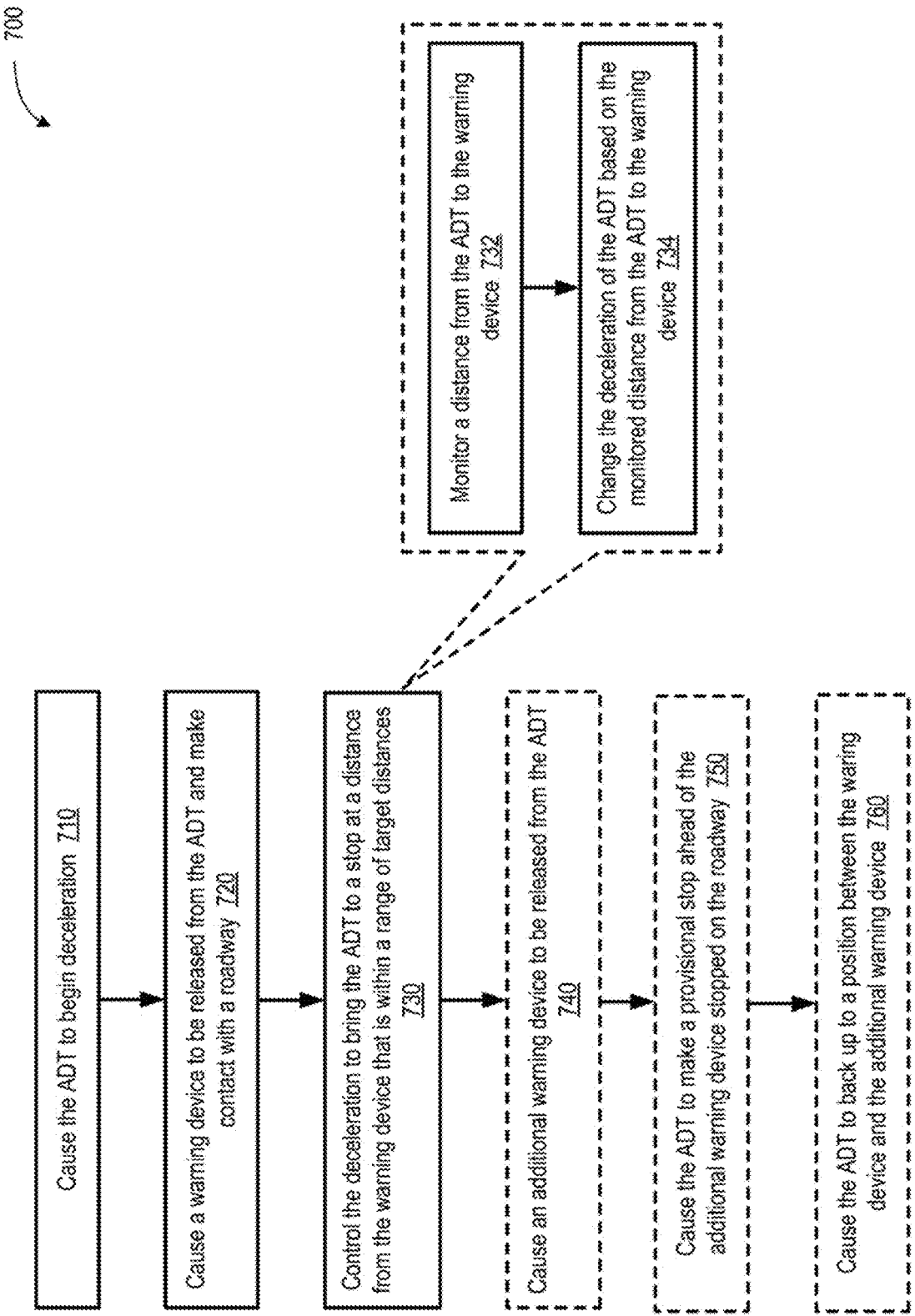
FIG. 7 depicts a flow diagram of an example method of automated placement of warning devices by a stopping autonomously driven truck, in accordance with some implementations of the present disclosure.

FIG. 7 depicts a flow diagram of an example method 700 of automated placement of warning devices by a stopping autonomously driven truck, in accordance with some implementations of the present disclosure. At block 710, method 700 can include causing the ADT, using an ADT control system (e.g., AVCS 140), to begin deceleration. For example, ADT can experience a mechanical problem, a blown tire, a sensing system problem (e.g., non-functioning cameras or lidar/radar sensors, etc.), an electronics problem, a mapping issue, a road blockage or detour issue, or any other issue that makes operating the ADT suboptimal or unsafe. At block 720, method 700 can continue with causing a warning device to be released from the ADT and to make contact with a roadway. In some implementations, the data processing system can track deceleration schedule of the ADT and release the warning device when the speed of the ADT falls to a predetermined level (e.g., 15 mph, 20 mph, 25 mph, etc.). The release of the warning device can be performed using a rear-facing release system, e.g., when the deceleration of the warning device from the contact with the road is expected to be greater than the deceleration of the ADT. Alternatively or in addition, the release of the warning device can be performed using a forward-facing release system, e.g., when the deceleration of the warning device from the contact with the road is expected to be less than the deceleration of the ADT.

In some implementations, the warning device(s) can have a spheroidal shape or a cylindrical shape (to facilitate rolling on the road surface), and can include a depiction of a regulation-mandated warning sign, e.g., as illustrated in FIG. 3A. In some implementations, the warning device(s) can have an asymmetric distribution of mass, to ensure that the warning device comes to a stop with a desired side up. In some implementations, the warning device is made of one or more materials capable of restoring shape after deformation (e.g., after being driven over by the ADT).

At block 730, method 700 can continue with controlling the deceleration of the ADT to bring the ADT to a stop at a distance from the warning device that is within a range of target distances, which can be distances that are prescribed by traffic laws and regulations. As depicted with a callout portion of FIG. 7, controlling the deceleration of the ADT can include, at block 732, monitoring, using a sensing system of the ADT, a distance from the ADT to the warning device after releasing the warning device. Additionally, controlling the deceleration of the ADT can include, as depicted with block 734, changing the deceleration of the ADT based on the monitored distance from the ADT to the warning device. For example, if the warning device has been released from the rear of the ADT and is slowing down with a deceleration that is higher or lower than expected, the control system of the ADT can apply more pressure or less pressure to the brakes of the ADT. For example, if the warning device released from ADT experiences deceleration $a_{WD}$, then having been released from the ADT moving with speed v, the warning device will stop after traveling distance $L=v^2/(2a_{WD})$. To ensure that the ADT stops a distance L+ $\Delta L$ in front of the stopped warning device, the ADT can slow down with deceleration $a_{ADT}$ that is determined from, $$\frac{1}{a_{ADT}} = \frac{1}{a_{WD}} + \frac{2\Delta L}{v^2}.$$

Accordingly, if the measured (e.g., using lidars/radars/etc.) deceleration $a_{WD}$ of the warning device is different from the expected (e.g., based on field testing) deceleration, the data processing system can use the above (or a similar) to adjust the deceleration of the ADT so that the target relative distance $\Delta L$ is achieved. The deceleration $a_{WD}$ can be monitored by tracking the velocity of the warning device (e.g., relative to the ADT and using a lidar, radar, or a sonar sensor) with time that elapsed since the deployment of the warning device. In some implementations, the target distance can be within an interval of acceptable distances, $\Delta L \in [L_1, L_2]$, where the minimum $L_1$ and maximum $L_2$ acceptable distances are determined according to local traffic regulation.

It should be understood that the above description is illustrative and various other monitoring procedures and mathematical schemes can be used to ensure that the warning device stops at a desired distance from the ADT. In some implementations, the deployment of the warning device can include pushing the warning device relative to the ADT with some initial velocity (and adjusting the deceleration schedule accordingly). In some implementations, the warning device can be deployed, e.g., launched in a target direction, after the ADT has come to a stop.

In some implementations, more than one warning device can be deployed, as depicted with optional blocks 740-760. For example, at block 740, method 700 can include causing an additional warning device to be released from the ADT after releasing the warning device, e.g., as depicted in FIG. 3C. At block 750, method 700 can include causing the ADT to make a provisional stop, e.g., as depicted in FIG. 3D, ahead of both the warning device and the additional warning device stopped on the roadway. In some implementations, the provisional stop can be behind both the warning device and the additional warning device. At block 760, method 700 can include causing the ADT to move (e.g., by backing up or moving forward) to a position between the warning device and the additional warning device, as depicted in FIG. 3E. In some implementations, the ADT stops between the warning device and the additional warning device and no backing up or moving forward is performed. In some implementations, even if the ADT stops between the warning device and the additional warning device, the ADT can still adjust its position for more precise centering between the stopped devices.

Figure 8:
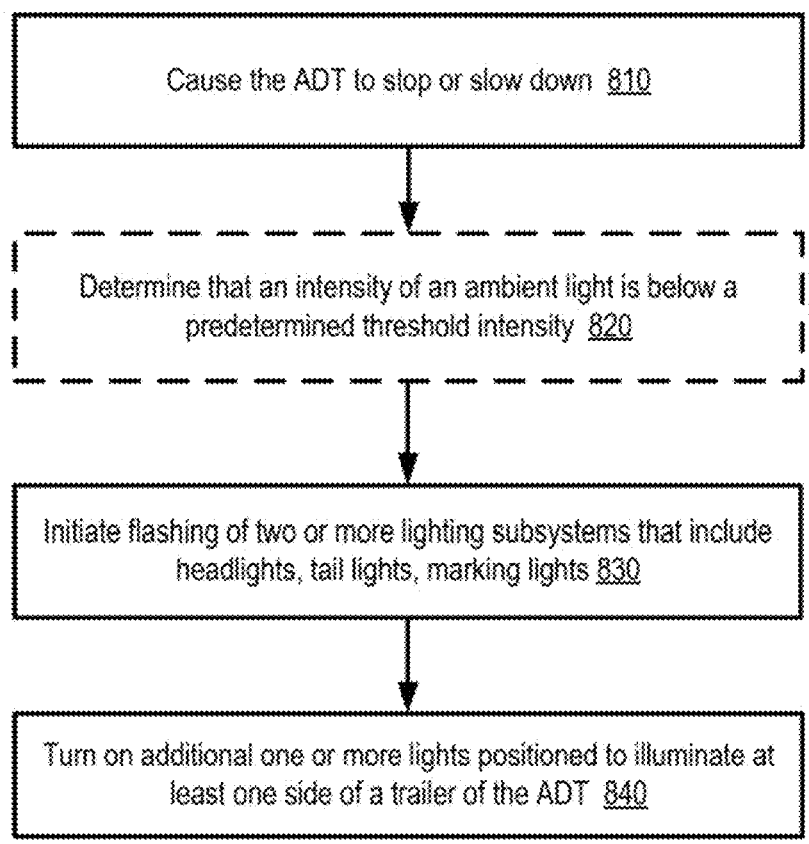
FIG. 8 depicts a flow diagram of an example method of using lighting devices for enhanced illumination of stranded and stopped autonomous driving trucks, in accordance with some implementations of the present disclosure.

FIG. 8 depicts a flow diagram of an example method 800 of using lighting devices for enhanced illumination of stranded and stopped autonomous driving trucks, in accordance with some implementations of the present disclosure. Method 800 can be used to operate a system of lighting devices that includes multiple subsystems, such as a headlight subsystem having any number of low-beam lights, any number of high-beam lights, fog lights, daytime running lights, floodlights, and so on, including lights of various colors and produced by various sources, e.g., white lights, yellow light, halogen lights, etc. The system of lighting devices can also include a taillight subsystem, e.g., red tail lights, which can be positioned at the rear of the vehicle, on the sides of the vehicle, etc. The system of lighting devices can further include a turning light subsystem. The system of lighting devices can also include a marker light subsystem, e.g., a plurality of amber lights. Any of the lights of the headlight subsystem, the taillight subsystem, the marker light subsystem, etc., can be positioned at the bottom of the vehicle, at the top of the vehicle (e.g., top of the tractor cabin, top of the trailer, and can exceed the tractor and trailer height), or anywhere in between. The system of lighting devices of the ADT can further include any suitable additional subsystem.

At block 810, method 800 can include causing the ADT (e.g., by the instructions from the autonomous vehicle control system), to stop or slow down, which can be for any reasons referenced above in conjunction with method 700. At optional block 820, the data processing system can determine that an intensity of an ambient light is below a predetermined threshold intensity and make subsequent operations of the method conditional upon such finding. This can ensure that the enhanced illumination is used when the visibility is low, e.g., at night, under unfavorable weather conditions (snow, rain, fog, dusty wind, etc.), and so on.

At block 830, method 800 can continue with initiating flashing of two or more subsystems of the system of lighting devices, e.g., flashing of the headlight subsystem and the marker lights subsystem, or headlight subsystem and tail light subsystem, or all three or four subsystems at the same time. In some implementations, flashing can include one or more patterns (e.g., S-O-S or any other suitable pattern). In some implementations, different subsystems can flash using different patterns that have different periods, different right-left cycles, etc. For example a first subsystem can be flashing according to a first flashing pattern (e.g., right headlights flashing intermittently with left headlights), and a second subsystem can be flashing according to a second flashing pattern (e.g. all marker lights flashing simultaneously or in a circular running fashion).

At optional block 840, method 800 can include turning on an additional subsystem that can include one or more high-luminance lights positioned to illuminate at least one side of a trailer of the ADT (e.g., lights 420 in FIG. 4B). The high-luminance light can be turned inwards, towards the sides of the trailer, or can be turned partially inwards and partially outwards. In some implementations, each of the one or more high-luminance lights can be positioned on or near a lidar sensor of the ADT, which can be at a location where rearview mirrors are located on conventional driver-operated trucks. In some implementations, each of the one or more high-luminance lights has a luminance that is at least that of the illuminated brake light of the ADT.

In some implementations, method 700 can be performed prior to or in parallel with method 800. For example, when an ADT is experiencing an issue that requires stopping, the ADT can deploy one or more warning devices, as described in conjunction with method 700, and then further deploy the enhanced illumination system, as described in conjunction with method 800. The enhanced illumination system can be deployed after the deployment of warning devices or concurrently with such a deployment.

Figure 9:
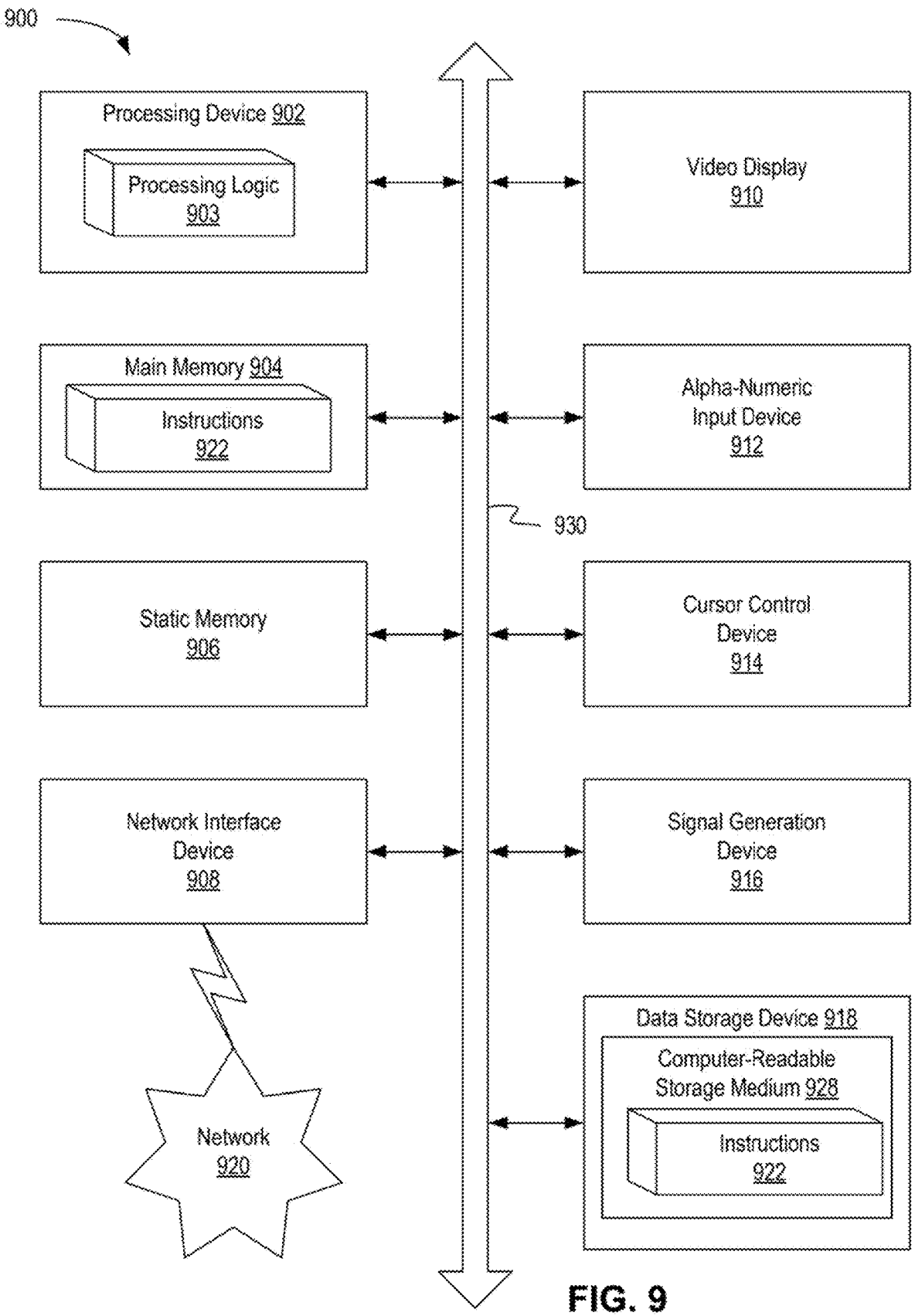
FIG. 9 depicts a block diagram of an example computer device capable of performing operations in accordance with some implementations of the present disclosure.

FIG. 9 depicts a block diagram of an example computer device 900 capable of performing operations in accordance with some implementations of the present disclosure. Example computer device 900 can be connected to other computer devices in a LAN, an intranet, an extranet, and/or the Internet. Computer device 900 can execute operations of the sensing system 120, data processing system 130, AVCS 140, or any combination thereof. Computer device 900 can execute operations of a dispatch/control center. Computer device 900 can operate in the capacity of a server in a client-server network environment. Computer device 900 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 900 can include a processing device 902 (also referred to as a processor or CPU), which can include processing logic 903, a main memory 904 (e.g., read-only memory (ROM), flash memory, dynamic random access memory (DRAM) such as synchronous DRAM (SDRAM), etc.), a static memory 906 (e.g., flash memory, static random access memory (SRAM), etc.), and a secondary memory (e.g., a data storage device 918), which can communicate with each other via a bus 930.

Processing device 902 represents one or more general-purpose processing devices such as a microprocessor, central processing unit, or the like. More particularly, processing device 902 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 902 can be configured to execute instructions performing methods 500-600 of suspension adjustments in response to detection of road imperfections, method 700 of automated placement of warning devices by a stopping autonomously driven truck, and method 800 of using lighting devices for enhanced illumination of stranded and stopped autonomous driving trucks.

Example computer device 900 can further comprise a network interface device 908, which can be communicatively coupled to a network 920. Example computer device 900 can further comprise a video display 910 (e.g., a liquid crystal display (LCD), a touch screen, or a cathode ray tube (CRT)), an alphanumeric input device 912 (e.g., a keyboard), a cursor control device 914 (e.g., a mouse), and an acoustic signal generation device 916 (e.g., a speaker).

Data storage device 918 can include a computer-readable storage medium (or, more specifically, a non-transitory computer-readable storage medium) 928 on which is stored one or more sets of executable instructions 922. In accordance with one or more aspects of the present disclosure, executable instructions 922 can comprise executable instructions performing methods 500-600 of suspension adjustments in response to detection of road imperfections, method 700 of automated placement of warning devices by a stopping autonomously driven truck, and method 800 of using lighting devices for enhanced illumination of stranded and stopped autonomous driving trucks.

Executable instructions 922 can also reside, completely or at least partially, within main memory 904 and/or within processing device 902 during execution thereof by example computer device 900, main memory 904 and processing device 902 also constituting computer-readable storage media. Executable instructions 922 can further be transmitted or received over a network via network interface device 908.

While the computer-readable storage medium 928 is shown in FIG. 9 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method to operate an autonomously driven truck (ADT), the method comprising:
   obtaining a first set of road data characterizing a quality of a first portion of a road traveled by the ADT, a suspension of the ADT having an initial height;
   identifying, using a data processing system of the ADT and based on the first set of road data, one or more road imperfections;
   determining one or more first parameters characterizing the one or more road imperfections; and
   responsive to identifying the one or more road imperfections, determining, by the data processing system of the ADT and using the one or more first parameters, first settings of a suspension of the ADT, wherein the first settings comprise:
      a first height of the suspension of the ADT, wherein the first height is higher than the initial height, and a first stiffness of the suspension of the ADT; and
   causing an autonomous control system of the ADT to configure the suspension of the ADT based on the first settings.

2. The method of claim 1, wherein the one or more first parameters are determined using sensing data generated by a sensing system of the ADT and comprise at least one of:
   a length associated with the one or more road imperfections,
   a width associated with the one or more road imperfections,
   a height associated with the one or more road imperfections,
   a depth associated with the one or more road imperfections, or
   a number of the one or more road imperfections within the first portion of the road.

3. The method of claim 1, further comprising:
   obtaining a second set of road data characterizing a quality of a second portion of the road traveled by the ADT;
   responsive to the quality of the second portion of the road being higher than the quality of the first portion of the road,
   determining second settings of the suspension of the ADT, wherein the second settings comprise:
      a second height of the suspension of the ADT, wherein the second height is lower that the first height; and
   causing the autonomous control system of the ADT to configure the suspension of the ADT based on the second settings.

4. The method of claim 3, wherein the second settings further comprise:
   a second stiffness of the suspension of the ADT, wherein the second stiffness is higher than the first stiffness.

5. The method of claim 3, wherein determining the second settings of the suspension of the ADT comprises:
   estimating an energy cost of changing the suspension of the ADT from the first settings to the second settings.

6. The method of claim 3, wherein determining the second settings of the suspension of the ADT comprises:
   estimating an energy saving from an improved aerodynamic performance gained by changing the suspension of the ADT from the first settings to the second settings, the energy saving being estimated based on a reference distance of travel of the ADT.

7. The method of claim 1, wherein prior to identifying the one or more road imperfections, the suspension of the ADT was configured based on a historical road data for the first portion of the road traveled by the ADT.

8. A method to operate an autonomously driven truck (ADT), the method comprising:
   obtaining a first set of road data characterizing a quality of a first portion of a road traveled by the ADT, a suspension of the ADT having an initial height;
   identifying, using a data processing system of the ADT and based on the first set of road data, one or more road imperfections;
   determining one or more first parameters characterizing the one or more road imperfections; and
   responsive to the identified one or more road imperfections, determining, by the data processing system of the ADT and using the one or more first parameters, first settings of a suspension of the ADT, wherein the first settings comprise a first height of the ADT above the road, wherein the first height is higher than the initial height;
   causing an autonomous control system of the ADT to configure the suspension of the ADT based on the first settings;
   obtaining a second set of road data characterizing a quality of a second portion of the road traveled by the ADT;
   responsive to the quality of the second portion of the road being higher than the quality of the first portion of the road,
   determining second settings of the suspension of the ADT, wherein the second settings comprise:
      a second height of the ADT above the road, wherein the second height is lower that the first height; and
   causing the autonomous control system of the ADT to configure the suspension of the ADT based on the second settings.

9. The method of claim 8, wherein the one or more first parameters are determined using sensing data generated by a sensing system of the ADT and comprise at least one of:
- a length associated with the one or more road imperfections,
- a width associated with the one or more road imperfections,
- a height associated with the one or more road imperfections,
- a depth associated with the one or more road imperfections, or
- a number of the one or more road imperfections within the first portion of the road.

10. The method of claim 8, wherein the first settings further comprise:
- a first stiffness of the suspension of the ADT, and
- wherein the second settings further comprise:
- a second stiffness of the suspension of the ADT, wherein the second stiffness is higher than the first stiffness.

11. The method of claim 8, wherein determining the second settings of the suspension of the ADT comprises:
- estimating an energy cost of changing the suspension of the ADT from the first settings to the second settings.

12. The method of claim 8, wherein determining the second settings of the suspension of the ADT comprises:
- estimating an energy saving from an improved aerodynamic performance gained by changing the suspension of the ADT from the first settings to the second settings, the energy saving being estimated based on a reference distance of travel of the ADT.

13. The method of claim 8, wherein prior to identifying the one or more road imperfections, the suspension of the ADT was configured based on a historical road data for the first portion of the road traveled by the ADT.

14. A system comprising:
- a sensing system of an autonomously driven truck (ADT), the sensing system to:
  - obtain a first set of road data characterizing a quality of a first portion of a road traveled by the ADT, the ADT being at an initial height above the road;
- a data processing system of the ADT to:
  - identify, using the first set of road data, one or more road imperfections;
  - determine one or more first parameters characterizing the one or more road imperfections; and
  - responsive to the identified one or more road imperfections, determine, using the one or more first parameters, first settings of a suspension of the ADT, wherein the first settings comprise:
    - a first height of the ADT above the road, wherein the first height is higher than the initial height,
    - and a first stiffness of the suspension of the ADT; and
  - cause an autonomous control system of the ADT to configure the suspension of the ADT based on the first settings;
  - determine second settings of the suspension of the ADT, wherein the second settings comprise:
    - a second height of the ADT above the road, wherein the second height is lower that the first height;
  - estimate an energy cost of changing the suspension of the ADT from the first settings to the second settings; and
  - cause, in view of the estimated energy cost, the autonomous control system of the ADT to reconfigure the suspension of the ADT based on the second settings.

15. The system of claim 14, wherein the one or more first parameters are determined using sensing data generated by a sensing system of the ADT and comprise at least one of:
- a length associated with the one or more road imperfections,
- a width associated with the one or more road imperfections,
- a height associated with the one or more road imperfections,
- a depth associated with the one or more road imperfections, or
- a number of the one or more road imperfections within the first portion of the road.

16. The system of claim 14, wherein the sensing system is further to:
- obtain a second set of road data characterizing a quality of a second portion of the road traveled by the ADT; and
- wherein the data processing system is to futher determine the second settings of the suspension of the ADT in response to determining that the quality of the second portion of the road is higher than the quality of the first portion of the road.

17. The system of claim 14, wherein the second settings further comprise:
- a second stiffness of the suspension of the ADT, wherein the second stiffness is higher than the first stiffness.

18. The system of claim 14, wherein to determine the second settings of the suspension of the ADT, the data processing system is to:
- estimate an energy cost of changing the suspension of the ADT from the first settings to the second settings; and
- cause the autonomous control system of the ADT to reconfigure the suspension of the ADT in further view of the estimated energy cost.

19. The system of claim 18, wherein to determine the second settings of the suspension of the ADT, the data processing system is to:
- estimate an energy saving from an improved aerodynamic performance gained by changing the suspension of the ADT from the first settings to the second settings, the energy saving being estimated based on a reference distance of travel of the ADT.

20. The system of claim 14, wherein prior to identifying the one or more road imperfections, the suspension of the ADT was configured based on a historical road data for the first portion of the road traveled by the ADT.

* * * * *